United States Patent
Murakoshi et al.

(10) Patent No.: US 10,969,662 B2
(45) Date of Patent: *Apr. 6, 2021

(54) POSTURE CONTROL APPARATUS, HOLDING APPARATUS, POSTURE CONTROL METHOD, AND PROGRAM

(71) Applicant: Sony Corporation, Tokyo (JP)

(72) Inventors: Sho Murakoshi, Tokyo (JP); Hidetoshi Kabasawa, Kanagawa (JP); Tomohiro Matsumoto, Kanagawa (JP); Masahiro Segami, Kanagawa (JP); Kosei Yamashita, Kanagawa (JP)

(73) Assignee: Sony Corporation, Tokyo (JP)

( * ) Notice: Subject to any disclaimer, the term of this patent is extended or adjusted under 35 U.S.C. 154(b) by 10 days.

This patent is subject to a terminal disclaimer.

(21) Appl. No.: 16/479,155

(22) PCT Filed: Nov. 14, 2017

(86) PCT No.: PCT/JP2017/040848
§ 371 (c)(1),
(2) Date: Jul. 18, 2019

(87) PCT Pub. No.: WO2018/135114
PCT Pub. Date: Jul. 26, 2018

(65) Prior Publication Data
US 2020/0041877 A1 Feb. 6, 2020

(30) Foreign Application Priority Data
Jan. 19, 2017 (JP) .............................. JP2017-007395

(51) Int. Cl.
*G03B 15/00* (2006.01)
*G03B 17/56* (2006.01)
(Continued)

(52) U.S. Cl.
CPC ........... *G03B 17/561* (2013.01); *B64D 47/00* (2013.01); *G01C 9/08* (2013.01); *G03B 15/006* (2013.01); *G01P 15/09* (2013.01); *G01P 15/123* (2013.01)

(58) Field of Classification Search
USPC .......................................... 396/428
See application file for complete search history.

(56) References Cited

U.S. PATENT DOCUMENTS

| | | | |
|---|---|---|---|
| 3,979,089 A * | 9/1976 | Miller .................... | B64D 25/10 244/122 AD |
| 8,459,094 B2 * | 6/2013 | Yanni ...................... | G01P 21/00 73/1.38 |

(Continued)

FOREIGN PATENT DOCUMENTS

| | | |
|---|---|---|
| CN | 106200216 | 12/2016 |
| JP | S63-078018 A | 4/1988 |

(Continued)

OTHER PUBLICATIONS

International Search Report and Written Opinion issued in connection with International Patent Application No. PCT/JP2017/040848, dated Jan. 23, 2018. (10 pages).

*Primary Examiner* — Clayton E. LaBalle
*Assistant Examiner* — Warren K Fenwick
(74) *Attorney, Agent, or Firm* — K&L Gates LLP

(57) ABSTRACT

A posture control apparatus, comprising a control unit that determines, on a basis of a static acceleration component, a gravity direction in a holding apparatus holding an object to be held, the static acceleration component being computed on a basis of a first acceleration detection signal and a second acceleration detection signal, the first acceleration detection signal being acquired by detecting a dynamic acceleration component acting on the holding apparatus, the second acceleration detection signal being acquired by (Continued)

detecting the dynamic acceleration component and the static acceleration component acting on the holding apparatus, and controls, by controlling posture of the holding apparatus on a basis of the gravity direction, posture of the object to be held.

17 Claims, 14 Drawing Sheets

(51) Int. Cl.
    *G01C 9/08*     (2006.01)
    *B64D 47/00*     (2006.01)
    *G01P 15/09*     (2006.01)
    *G01P 15/12*     (2006.01)

(56) References Cited

U.S. PATENT DOCUMENTS

| | | | |
|---|---|---|---|
| 9,994,228 B2 * | 6/2018 | Krueger | A61B 3/145 |
| 2008/0289417 A1 * | 11/2008 | Okada | G01P 15/0922 |
| | | | 73/504.03 |
| 2016/0198088 A1 | 7/2016 | Wang et al. | |
| 2019/0391598 A1 * | 12/2019 | Murakoshi | G05D 1/0808 |

FOREIGN PATENT DOCUMENTS

| | | |
|---|---|---|
| JP | S63-117211 A | 5/1988 |
| JP | 2002-277245 | 9/2002 |
| JP | 2002-369046 A | 12/2002 |
| JP | 2004-359002 A | 12/2004 |
| JP | 2007-232662 A | 9/2007 |
| JP | 2008-244893 A | 10/2008 |
| JP | 2016-219941 A | 12/2016 |
| WO | 2016/101155 A1 | 6/2016 |

* cited by examiner

POSTURE CONTROL APPARATUS, HOLDING APPARATUS, POSTURE CONTROL METHOD, AND PROGRAM

TECHNICAL FIELD

The present technology relates to a technology for controlling the posture of a holding apparatus that holds an object to be held.

BACKGROUND ART

In the past, a camera gimbal has been widely known as an apparatus that allows a camera to stably captures an image (see, for example, Patent Literature 1). The camera gimbal has a mechanism for rotating the camera around two axes or three axes, and controls the posture of the camera in space by rotating this mechanism.

The camera gimbal is often used by being held by a hand or placed at a predetermined place. However, in recent years, the camera gimbal is placed on a flight vehicle such as a drone for use in some cases (see, for example, Patent Literature 2).

CITATION LIST

Patent Literature

Patent Literature 1: Japanese Patent Application Laid-open No. 2002-369046
Patent Literature 2: Japanese Patent Application Laid-open No. 2016-219941

DISCLOSURE OF INVENTION

Technical Problem

For example, in order to allow the camera to stably capture an image, it is necessary to accurately control the posture of the camera. Therefore, it is important to accurately control the posture of an object to be held of the camera or the like.

In view of the circumstances as described above, it is an object of the present technology to provide a technology capable of accurately controlling posture of an object to be held.

Solution to Problem

In order to achieve the above-mentioned object, a posture control apparatus according to the present technology includes a control unit. The control unit determines, on a basis of a static acceleration component, a gravity direction in a holding apparatus holding an object to be held, the static acceleration component being computed on a basis of a first acceleration detection signal and a second acceleration detection signal, the first acceleration detection signal being acquired by detecting a dynamic acceleration component acting on the holding apparatus, the second acceleration detection signal being acquired by detecting the dynamic acceleration component and the static acceleration component acting on the holding apparatus, and controls, by controlling posture of the holding apparatus on a basis of the gravity direction, posture of the object to be held.

In this posture control apparatus, the static acceleration component is computed from the two signals of the first acceleration detection signal and the second acceleration detection signal, the first acceleration detection signal being acquired by detecting the dynamic acceleration component acting on the holding apparatus, the second acceleration detection signal being acquired by detecting the dynamic acceleration component and the static acceleration component acting on the holding apparatus. Therefore, it is possible to accurately compute a static acceleration component that can be a gravitational acceleration component, and thus, the gravity direction of the holding apparatus can be accurately determined. Therefore, it is possible to accurately control the posture of the holding apparatus. As a result, it is possible to accurately control the posture of the object to be held by the holding apparatus.

In the posture control apparatus, the control unit may correct the static acceleration component on a basis of correction information for correcting the static acceleration component, and determines the gravity direction on a basis of the corrected static acceleration component.

As a result, it is possible to more accurately determine the gravity direction of the holding apparatus, and more accurately control the posture of the object to be held.

In the posture control apparatus, the control unit may correct the static acceleration component on a basis of the correction information for correcting the static acceleration component by the dynamic acceleration component.

As a result, it is possible to more accurately determine the gravity direction of the holding apparatus, and more accurately control the posture of the object to be held.

In the posture control apparatus, the control unit may correct the static acceleration component on a basis of the correction information for correcting the static acceleration component by the angular velocity component acting on the holding apparatus.

As a result, it is possible to more accurately determine the gravity direction of the holding apparatus, and more accurately control the posture of the object to be held.

In the posture control apparatus, the control unit may generate the correction information while the holding apparatus is disposed at a certain place.

As a result, it is possible to acquire the correction information by performing calibration while the holding apparatus is stationary.

In the posture control apparatus, the holding apparatus may be attached to a flight vehicle, and the control unit may generate the correction information while the flight vehicle is in the air.

As a result, it is possible to acquire the correction information by performing calibration while the flight vehicle is in the air.

The posture control apparatus may further include an acceleration calculation unit. The acceleration calculation unit computes the static acceleration component on a basis of the first acceleration detection signal and the second acceleration detection signal, the first acceleration detection signal having an alternating current waveform corresponding to the dynamic acceleration component, the second acceleration detection signal having an output waveform, an alternating current waveform corresponding to the dynamic acceleration component being superimposed on a direct current component corresponding to the static acceleration component in the output waveform.

In the posture control apparatus, the acceleration calculation unit may include a calculation circuit that computes the static acceleration component on a basis of a difference signal between the first acceleration detection signal and the second acceleration detection signal.

As a result, it is possible to accurately compute the static acceleration component from the first acceleration detection signal and the second acceleration detection signal.

In the posture control apparatus, the acceleration calculation unit may further include a gain adjustment circuit that adjusts gain of each signal so that the first acceleration detection signal and the second acceleration detection signal are at the same level.

As a result, it is possible to more accurately compute the static acceleration component from the first acceleration detection signal and the second acceleration detection signal.

In the posture control apparatus, the acceleration calculation unit may further include a correction circuit that computes a correction coefficient on a basis of the difference signal and corrects one of the first acceleration detection signal and the second acceleration detection signal using the correction coefficient.

As a result, it is possible to more accurately compute the static acceleration component from the first acceleration detection signal and the second acceleration detection signal.

The posture control apparatus may further include a detection unit including a movable portion, a piezoelectric first acceleration detection unit, and a non-piezoelectric second acceleration detection unit, the movable portion being movable upon receiving an acceleration acting on the holding apparatus, the piezoelectric first acceleration detection unit being provided on the movable portion to output the first acceleration detection signal, the non-piezoelectric second acceleration detection unit being provided on the movable portion to output the second acceleration detection signal.

In this posture control apparatus, by using the difference between the detection schemes (piezoelectric and non-piezoelectric) of the first acceleration detection unit and the second acceleration detection unit, it is possible to accurately compute the static acceleration component from outputs thereof.

In the posture control apparatus, the second acceleration detection unit may include a piezoresistive acceleration detection device. Alternatively, the second acceleration detection unit may include a capacitive acceleration detection device.

A posture control apparatus according to another aspect of the present technology includes a control unit. The control unit determines, on a basis of a static acceleration component, a gravity direction in an object to be held by a holding apparatus, the static acceleration component being computed on a basis of a first acceleration detection signal and a second acceleration detection signal, the first acceleration detection signal being acquired by detecting a dynamic acceleration component acting on the object to be held, the second acceleration detection signal being acquired by detecting the dynamic acceleration component and the static acceleration component acting on the object to be held, and controls, by controlling posture of the holding apparatus on a basis of the gravity direction, posture of the object to be held.

In this posture control apparatus, the static acceleration component is computed from the two signals of the first acceleration detection signal and the second acceleration detection signal, the first acceleration detection signal being acquired by detecting the dynamic acceleration component acting on the object to be held, the second acceleration detection signal being acquired by detecting the dynamic acceleration component and the static acceleration component acting on the object to be held. Therefore, it is possible to accurately compute the static acceleration component that can be regarded as a gravitational acceleration component, and thus, the gravity direction of the object to be held can be accurately determined. Therefore, it is possible to accurately control the posture of the holding apparatus holding the object to be held. As a result, it is possible to accurately control the posture of the object to be held.

A holding apparatus according to the present technology includes a detection unit; and a control unit. The detection unit outputs a first acceleration detection signal and a second acceleration detection signal, the first acceleration detection signal being acquired by detecting a dynamic acceleration component acting on a holding apparatus holding an object to be held, the second acceleration detection signal being acquired by detecting the dynamic acceleration component and a static acceleration component acting on the holding apparatus. The control unit determines, on a basis of the static acceleration component computed on a basis of the first acceleration detection signal and the second acceleration detection signal, a gravity direction in the holding apparatus, and controls, by controlling posture of the holding apparatus on a basis of the gravity direction, posture of the object to be held.

A posture control method according to the present technology includes: determining, on a basis of a static acceleration component, a gravity direction in a holding apparatus holding an object to be held, the static acceleration component being computed on a basis of a first acceleration detection signal and a second acceleration detection signal, the first acceleration detection signal being acquired by detecting a dynamic acceleration component acting on the holding apparatus, the second acceleration detection signal being acquired by detecting the dynamic acceleration component and the static acceleration component acting on the holding apparatus; and controlling, by controlling posture of the holding apparatus on a basis of the gravity direction, posture of the object to be held.

A program according to the present technology causes a computer to execute the steps of: determining, on a basis of a static acceleration component, a gravity direction in a holding apparatus holding an object to be held, the static acceleration component being computed on a basis of a first acceleration detection signal and a second acceleration detection signal, the first acceleration detection signal being acquired by detecting a dynamic acceleration component acting on the holding apparatus, the second acceleration detection signal being acquired by detecting the dynamic acceleration component and the static acceleration component acting on the holding apparatus; and controlling, by controlling posture of the holding apparatus on a basis of the gravity direction, posture of the object to be held.

Advantageous Effects of Invention

As described above, in accordance with the present technology, it is possible to provide a technology capable of accurately controlling posture of an object to be held.

MODE(S) FOR CARRYING OUT THE INVENTION

Hereinafter, embodiments of the present technology will be described with reference to the drawings.

First Embodiment

<Configuration of Entire Camera Gimbal 50 and Configurations of Respective Units>

[External Configuration of Camera Gimbal 50]

Figure 1:
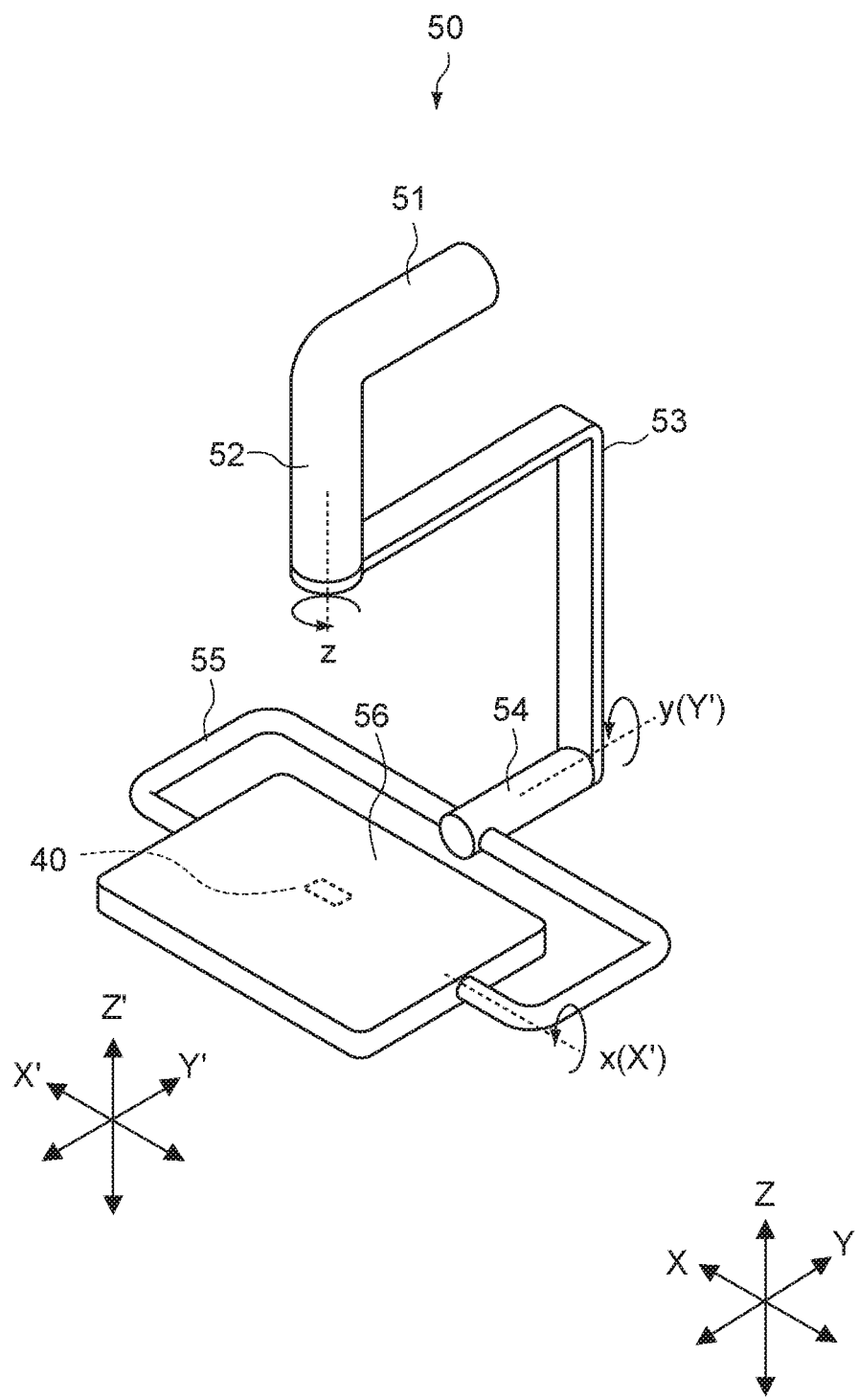
FIG. 1 is a perspective view showing a camera gimbal according to a first embodiment of the present technology.

FIG. 1 is a perspective view showing a camera gimbal 50 according to a first embodiment of the present technology.

As shown in FIG. 1, the camera gimbal 50 (holding apparatus: posture control apparatus) includes a grip portion 51, a shaft portion 52, and a first rotation member 53, which is rotatably attached to the shaft portion 52, in order from the top. Further, the camera gimbal 50 includes a second rotation member 54, which is rotatably attached to the first rotation member 53, a pedestal holding member 55 fixed to the second rotation member 54, and a pedestal 56 rotatably attached to the pedestal holding member 55.

Note that in the description of the present specification, a coordinate system based on the earth is referred to as the global coordinate system, and a coordinate system based on the pedestal 56 (camera) is referred to as the local coordinate system. Further, assumption is made that three axes orthogonal to each other in the global coordinate system are X, Y, and Z axes, and three axes orthogonal to each other in the local coordinate system are X', Y', and Z' axes.

The Z axis direction in the global coordinate system is the gravity direction, and the X axis direction and the Y axis direction are each an arbitrary direction in the horizontal direction. Further, the Z' axis direction in the local coordinate system is the thickness direction of the pedestal 56, the X' axis direction is the long side direction of the pedestal 56, and the Y' axis direction is the short side direction of the pedestal 56.

Further, in the description of the present specification, assumption is made that the direction of the rotation axis when the first rotation member 53 rotates with respect to the shaft portion 52 is the z axis direction and the direction of the rotation axis when the second rotation member 54 rotates with respect to the first rotation member 53 is the y axis direction. Further, the direction of the rotation axis when the pedestal 56 rotates with respect to the pedestal holding member 55 is the x axis direction.

Here, in the example shown in FIG. 1, the X' axis direction in the local coordinate system and the x axis direction that is the rotation axis are the same. Further, the Y' axis direction in the local coordinate system and the y axis direction that is the rotation axis are the same. Meanwhile, the Z' axis direction in the local coordinate system and the z axis direction that is the rotation axis direction differ in some cases (e.g., in the case where the pedestal 56 rotates around the x axis and the y axis from the state shown in FIG. 1). Note that the camera gimbal 50 may be configured to be capable of rotating the pedestal 56 in accordance with the Z' axis direction in the local coordinate system.

Hereinafter, the posture of the camera gimbal 50 in the case where the Z axis direction in the global coordinate system and the Z' axis direction (and the z axis direction) in the local coordinate system match will be referred to as basic posture.

The grip portion 51 and the shaft portion 52 are integrally formed, and are formed in such a way that one cylindrical member is bent at a right angle at the center. The grip portion 51 is a member to be gripped by a user, and is configured to extend in the direction orthogonal to the z axis direction.

The shaft portion 52 is configured to extend in the z axis direction, and holds the first rotation member 53 rotatably around the z axis at the lower end portion thereof.

The first rotation member 53 is a plate-like member formed in such a way that the center thereof is bent at a right angle, and is configured such that the upper half extends in the y axis direction and the lower half extends in the z axis direction. The first rotation member 53 is rotatably held around the z axis with respect to the shaft portion 52 at the upper end, and holds the second rotation member 54 rotatably around the y axis at the lower end portion.

The second rotation member 54 is a cylindrical member that extends in the y axis direction. The second rotation member 54 is rotatably held around the y axis with respect to the lower end portion of the first rotation body at one end portion, and holds the pedestal holding member 55 in a fixed state at the other end portion.

The pedestal holding member 55 includes two members formed symmetrically with respect to the zy plane. The pedestal holding member 55 is a cylindrical member, and is formed in such a way two parts thereof are bent at a right angle. The pedestal holding member 55 is fixed to the second rotation member 54 at one end portion thereof, and holds the pedestal 56 rotatably around the x axis at the other end portion.

The pedestal 56 is a rectangular plate-like member, and rotatably held around the x axis by the pedestal holding member 55. On the upper surface of the pedestal 56, a camera (an object to be held) (not shown) is fixed. At the position of the center of gravity of the pedestal 56 inside the pedestal 56, a sensor unit 40 that detects accelerations and angular velocities in three-axis directions (X', Y', and Z' axes) of the pedestal 56 is disposed.

In this embodiment, since the first rotation member 53 rotates around the z axis, the second rotation member 54 rotates around the y axis, and the pedestal 56 rotates around the x axis, the pedestal 56 is capable of rotating around the three axes (x, y, and z axes) with respect to the grip portion 51. Note that although the case where the pedestal 56 is rotatable around the three axes will be described in this embodiment, the pedestal 56 may be configured to be rotatable around one axis or two axes.

Further, although a configuration in which a camera is fixed on the pedestal 56 will be described in this embodiment, how the camera is fixed to the camera gimbal 50 is not particularly limited. For example, the camera may be sandwiched by the camera gimbal 50 from both sides in the x axis direction and fixed to the camera gimbal 50. In this case, the pedestal 56 can be omitted, and the sensor unit 40 is disposed in a portion (e.g., a member that sandwiches the camera in the x axis direction) that holds the camera that is an object to be held.

Basically, the camera gimbal 50 may have any configuration as long as it is configured to be capable of rotating the camera that is an object to be held around three axes (which may be one axis or two axes) and the sensor unit 40 is disposed in a portion that moves similarly to the camera.

[Functional Block Configuration]

Figure 2:
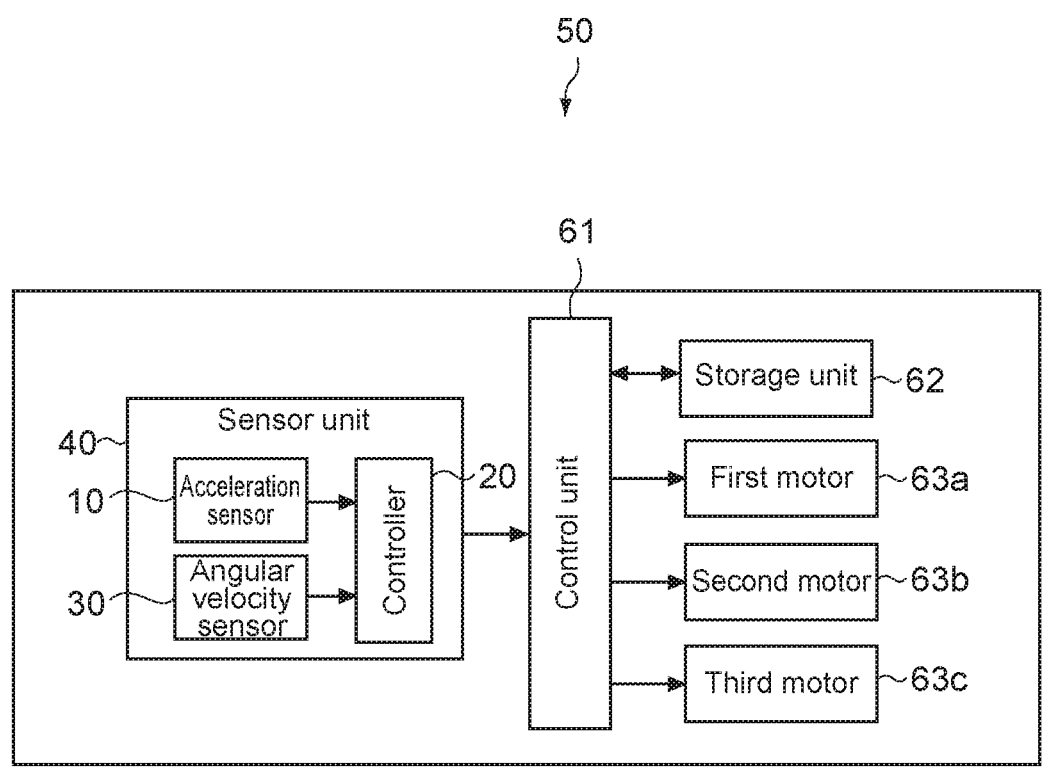
FIG. 2 is a block diagram showing a configuration of the camera gimbal.

FIG. 2 is a block diagram showing a configuration of the camera gimbal 50. As shown in FIG. 2, the camera gimbal 50 includes a control unit 61, the sensor unit 40, a storage unit 62, a first motor 63a, a second motor 63b, and a third motor 63c.

The sensor unit 40 includes an acceleration sensor 10, an angular velocity sensor 30, and a controller 20. The acceleration sensor 10 detects accelerations in the three-axis (X', Y', and Z' axes) directions received by the pedestal 56 (camera) in the local coordinate system.

The angular velocity sensor 30 is, for example, a gyro sensor (vibration type, rotation top type, or the like), and detects angular velocities around the three axes (X'Y'Z' axes) of the pedestal 56 (camera) in the local coordinate system.

The controller 20 processes outputs from the acceleration sensor 10 and the angular velocity sensor 30. In this embodiment, the controller 20 is configured to be capable of accurately separating a static acceleration component (gravitational acceleration component) based on gravity and a dynamic acceleration component (motion acceleration component) based on motion of the pedestal 56 (camera) from the acceleration received by the pedestal 56 (camera), and outputting them to the control unit 61. Note that the configuration of the sensor unit 40 will be described later in detail.

The control unit 61 includes a CPU (Central Processing Unit) or the like. The control unit 61 executes various types of calculation on the basis of various programs stored in the storage unit 62, and integrally controls the respective units of the camera gimbal 50.

In particular, in this embodiment, the control unit 61 determines the posture of the pedestal 56, and controls the posture of the pedestal 56, i.e., the posture of the camera.

Although the details will be described later, in this embodiment, the static acceleration component, i.e., the gravitational acceleration component, in the acceleration detection signal detected by the acceleration sensor 10 can be accurately computed in the sensor unit 40. Therefore, in this embodiment, the control unit 61 is capable of accurately determining the gravity direction of the pedestal 56, and accurately controlling the posture of the pedestal 56, i.e., the posture of the camera. Note that the processing of the control unit 61 will be described in detail later.

The storage unit 62 includes a non-volatile memory in which various program necessary for processing of the control unit 61 and various types of data are stored, and a volatile memory used as a work area of the control unit 61.

The first motor 63a rotates the first rotation member 53 around the z axis in response to the command from the control unit 61, and the second motor 63b rotates the second rotation member 54 around the y axis in response to the command from the control unit 61. Further, the third motor 63c rotates the pedestal 56 around the x axis in response to the command from the control unit 61.

[Configuration of Sensor Unit 40]

Figure 3:
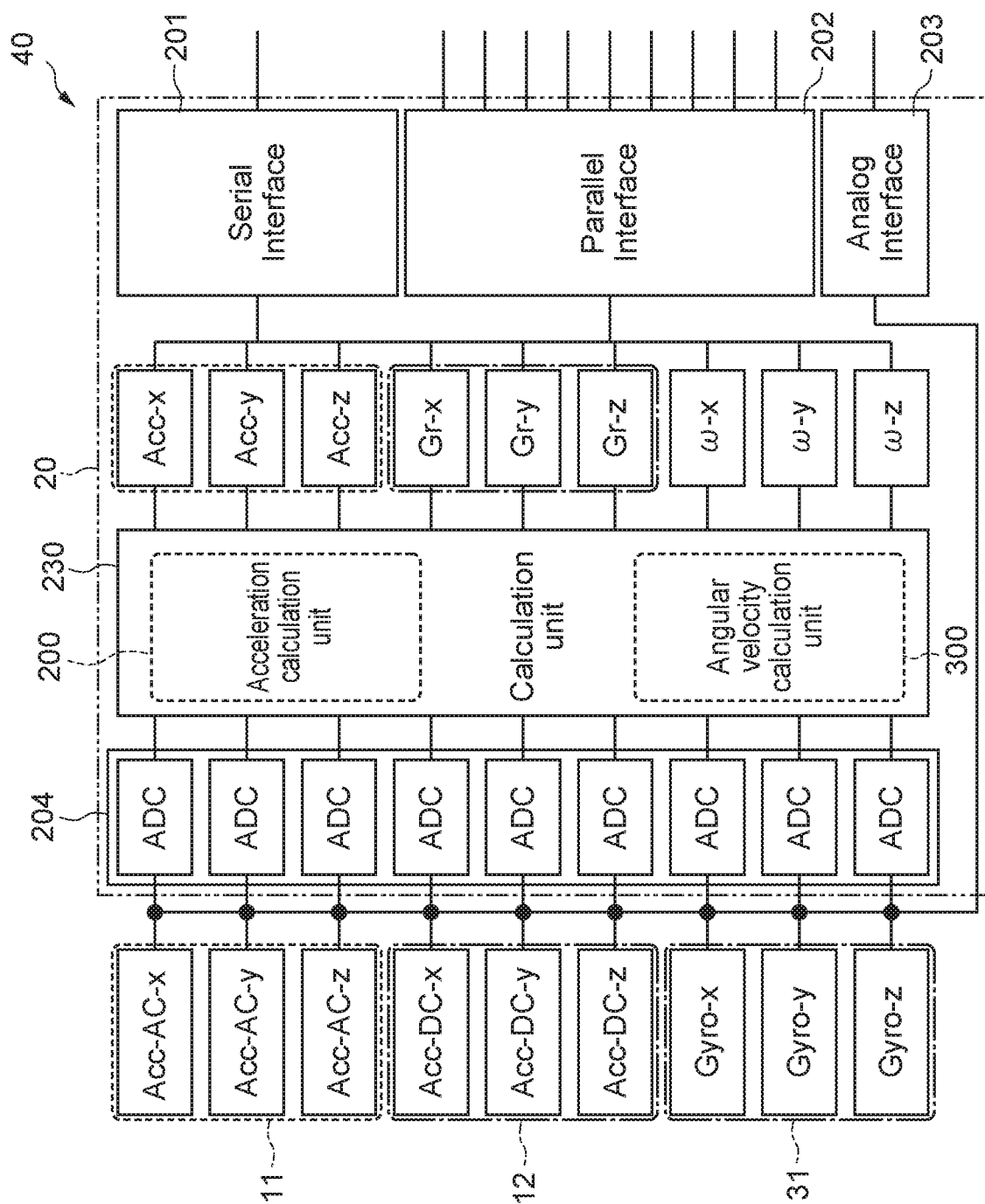
FIG. 3 is a block diagram showing a configuration of a sensor unit.

Next, the configuration of the sensor unit 40 according to this embodiment will be described in detail. FIG. 3 is a block diagram showing a configuration of the sensor unit 40.

The sensor unit 40 according to this embodiment is configured to be capable of computing a dynamic acceleration component and a static acceleration component from the acceleration detected by the acceleration sensor 10.

Here, the dynamic acceleration component typically refers to the AC component of the acceleration signal detected by the acceleration sensor 10, and typically corresponds to motion acceleration (translational acceleration, centrifugal acceleration, tangential acceleration, etc.) received by the pedestal 56 (camera). Meanwhile, the static acceleration component refers to the DC component of the acceleration signal detected by the acceleration sensor 10, and typically corresponds to a gravitational acceleration or an acceleration estimated to be a gravitational acceleration.

As shown in FIG. 3, the acceleration sensor 10 includes two types of acceleration detection units 11 and 12 (detection units: the first acceleration detection unit 11 and a second acceleration detection unit 12) that detect information relating to accelerations in three-axis directions (the local coordinate system). The angular velocity sensor 30 includes an angular velocity detection unit 31.

The first acceleration detection unit 11 is a piezoelectric acceleration sensor 10, and outputs a signal (Acc-AC-x) including information relating to the acceleration in the X' axis direction, a signal (Acc-AC-y) including information relating to the acceleration in the Y' axis direction, and a signal (Acc-AC-z) including information relating to the acceleration in the Z' axis direction. The signal output from the first acceleration detection unit 11 has an alternating current waveform corresponding to the acceleration of each axis.

Meanwhile, the second acceleration detection unit 12 is a non-piezoelectric acceleration sensor 10, and outputs a signal (Acc-DC-x) including information relating to the acceleration in the X' axis direction, a signal (Acc-DC-y) including information relating to the acceleration in the Y' axis direction, and a signal (Acc-DC-z) including information relating to the acceleration in the Z' axis direction. The signal output from the second acceleration detection unit 12 has an output waveform in which an alternating current component corresponding to the acceleration of each axis is superimposed on a direct current component.

The angular velocity detection unit 31 outputs an angular velocity detection signal (Gyro-x) around the X' axis, an angular velocity detection signal (Gyro-y) around the Y' axis, and an angular velocity detection signal (Gyro-z) around the Z' axis.

The controller 20 includes a convertor 204, a calculation unit 230, a serial interface 201, a parallel interface 202, and an analog interface 203.

The convertor 204 performs AD (Analog-Digital) conversion on the signals detected by the acceleration sensor 10 and the angular velocity sensor 30, and outputs them to the calculation unit 230.

The calculation unit 230 includes an acceleration calculation unit 200 and an angular velocity calculation unit 300. The acceleration calculation unit 200 computes, on the basis of the signals (Acc-AC-x, Acc-AC-y, and Acc-AC-z) output from the first acceleration detection unit 11 and the signals (Acc-DC-x, Acc-DC-y, and Acc-DC-z) output from the second acceleration detection unit 12, dynamic acceleration components (Acc-x, Acc-y, and Acc-z) and static acceleration components (Gr-x, Gr-y, and Gr-z) in three-axis directions in the local coordinate system.

The angular velocity calculation unit 300 computes, on the basis of the signals (Gyro-x, Gyro-y, and Gyro-z) output from the angular velocity detection unit 31, angular velocities (ω-x, ω-y, and ω-z) around the three axes in the local coordinate system.

The serial interface 201 is configured to be capable of sequentially outputting, to the control unit 61, the dynamic acceleration component and the static acceleration component computed by the acceleration calculation unit 200 and the angular velocity component computed by the angular velocity calculation unit 300. The parallel interface 202 is configured to be capable of outputting, to the control unit 61 in parallel, the dynamic acceleration component and the static acceleration component computed by the acceleration calculation unit 200 and the angular velocity component computed by the angular velocity calculation unit 300.

The controller 20 may include at least one of the serial interface 201 or the parallel interface 202, or may selectively switch the interface in response to the command from the control unit 61. The analog interface 203 is configured to be capable of outputting outputs of the first acceleration detection unit 11, the second acceleration detection unit 12, and the angular velocity detection unit 31 to the control unit 61 without changes, but may be omitted as necessary.

[Configuration of Acceleration Sensor 10]

Next, the configuration of the acceleration sensor 10 will be described in detail.

Figure 4:
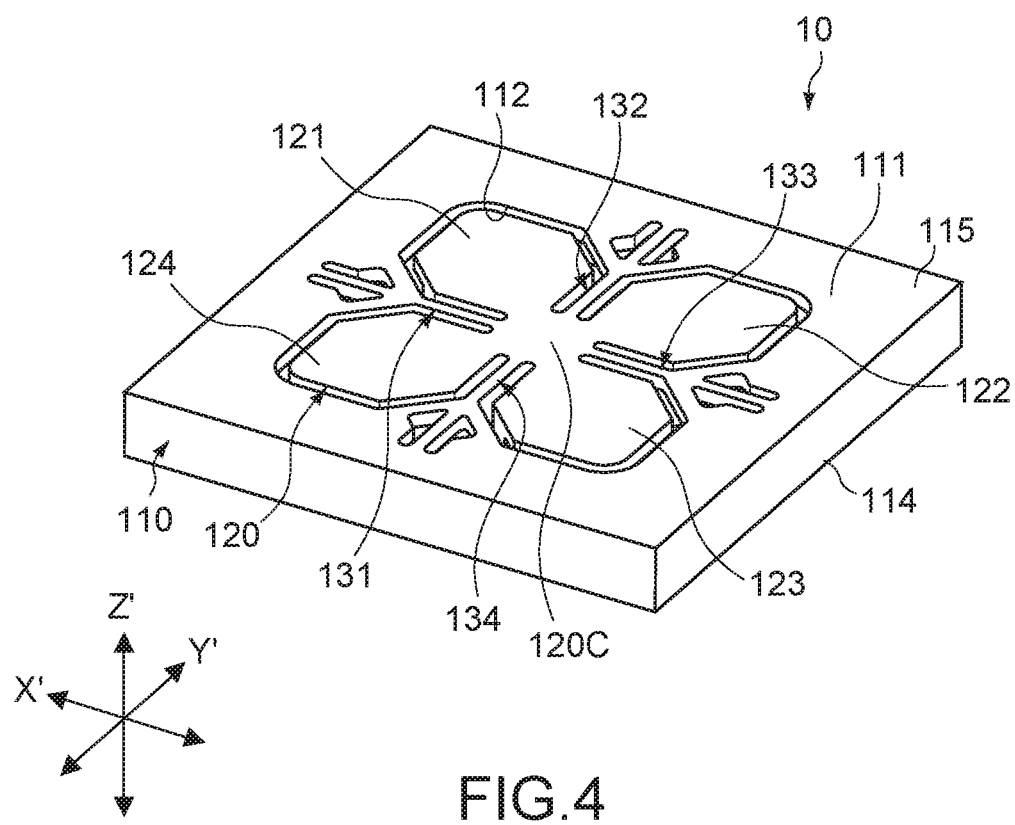
FIG. 4 is a perspective view on the front surface side schematically showing a configuration of an acceleration sensor.
Figure 5:
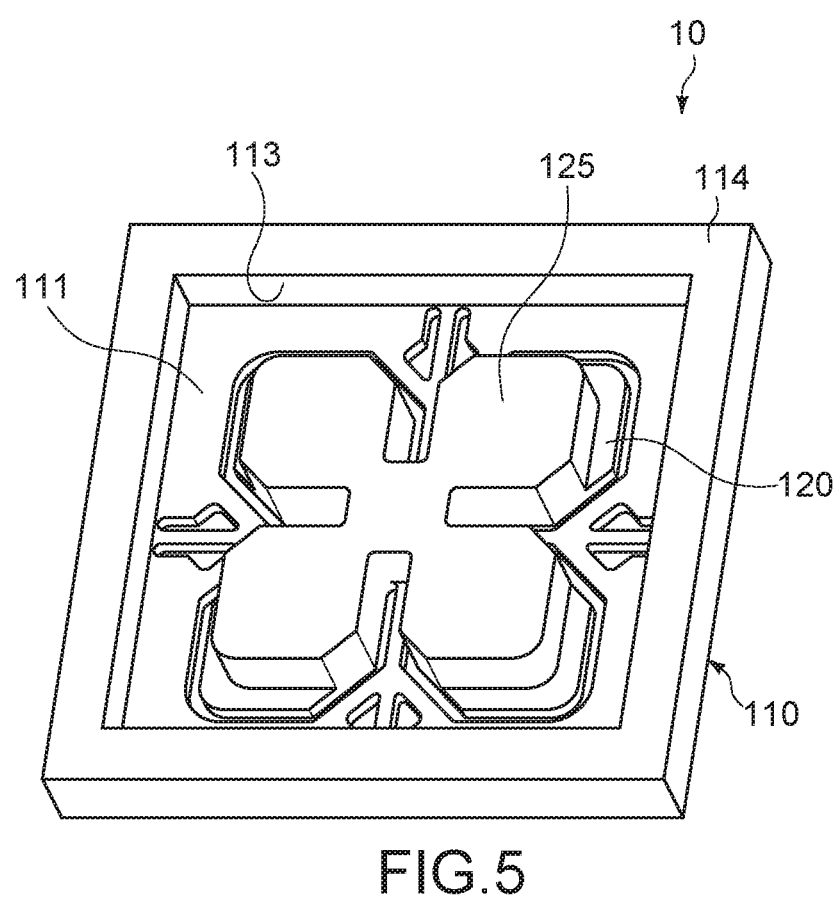
FIG. 5 is a perspective view on the rear surface side schematically showing a configuration of the acceleration sensor.
Figure 6:
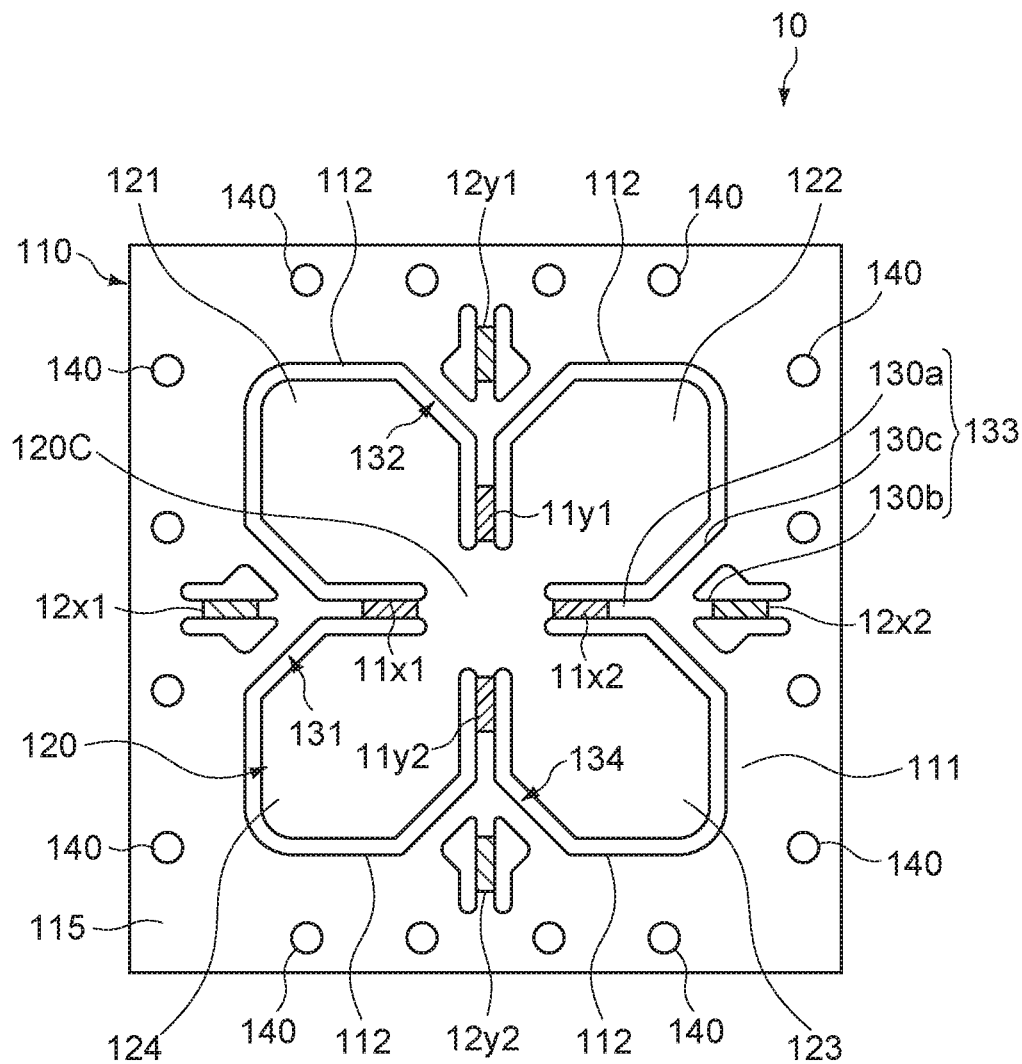
FIG. 6 is a plan view on the front surface side schematically showing a configuration of the acceleration sensor.
Figure 6:
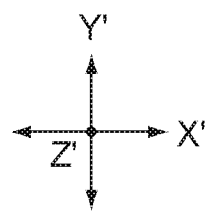

FIG. 4 to FIG. 6 are respectively a perspective view on the front surface side, a perspective view on the rear surface side, and a plan view on the front surface side schematically showing the configuration of the acceleration sensor 10.

The acceleration sensor device 10 includes a device body 110, a first acceleration detection unit 11 (first detection devices 11x1, 11x2, 11y1, and 11y2) and a second acceleration detection unit 12 (second detection devices 12x1, 12x2, 12y1, and 12y2).

The device body 110 includes a main surface portion 111 in parallel with the X'Y' plane and a support portion 114 on the opposite side. The device body 110 typically includes an SOI (Silicon On Insulator) substrate, and has a layered structure of an active layer (silicon substrate) forming the main surface portion 111 and a frame-like support layer (silicon substrate) forming the support portion 114. The main surface portion 111 and the support portion 114 have different thicknesses, and the support portion 114 is formed to be thicker than the main surface portion 111.

The device body 110 includes a movable plate 120 capable of moving in response to an acceleration. The movable plate 120 is provided at the center portion of the main surface portion 111, and formed by processing the above-mentioned active layer forming the main surface portion 111 into a predetermined shape. More specifically, a plurality of groove portions 112 formed in the main surface portion 111 form the movable plate 120 including a plurality of (in this example, four) blade portions 121 to 124 having a symmetrical shape with respect to the center position of the main surface portion 111. The peripheral portion of the main surface portion 111 constitutes a base portion 115 opposed to the support portion 114 in the Z' axis direction.

As shown in FIG. 5, the support portion 114 is formed in a frame shape including a rectangular recess 113 that opens the rear surface of the movable plate 120. The support portion 114 is configured as a bonding surface to be bonded to a support substrate (not shown). The above-mentioned support substrate may include a circuit substrate that electrically connects the acceleration sensor 10 and the controller 20, or a relay substrate or package substrate to be electrically connected to the circuit substrate. Alternatively, the support portion 114 may be provided with a plurality of external connection terminals to be electrically connected to the relay substrate or package substrate.

The blade portions 121 to 124 of the movable plate 120 each include a plate piece having a predetermined shape (in this example, a substantially hexagonal shape), and are arranged at intervals of 90° around a central axis in parallel with the Z' axis. The thickness of each of the blade portions 121 to 124 corresponds to the thickness of the above-mentioned active layer constituting the main surface portion 111. The blade portions 121 to 124 are integrally connected to each other at a center portion 120C of the movable plate 120, and integrally supported so as to be movable relative to the base portion 115.

As shown in FIG. 5, the movable plate 120 further includes a weight portion 125. The weight portion 125 is integrally provided on the rear surface of the center portion of the movable plate 120 and the rear surface of each of the blade portions 121 to 124. The size, thickness, and the like of the weight portion 125 are not particularly limited, and are set to appropriate magnitudes at which desired vibration characteristics of the movable plate 120 can be achieved. The weight portion 125 is formed by, for example, processing the above-mentioned layer forming the support portion 114 into a predetermined shape.

As shown in FIG. 4 and FIG. 6, the movable plate 120 is connected to the base portion 115 via a plurality of (in this example, four) bridge portions 131 to 134. The plurality of bridge portions 131 to 134 are provided between the blade portions 121 to 124, and formed by processing the above-mentioned active layer forming the main surface portion 111 into a predetermined shape. The bridge portion 131 and the bridge portion 133 are disposed to face each other in the X' axis direction, and the bridge portion 132 and the bridge portion 134 are disposed to face each other in the Y' axis direction.

The bridge portions 131 to 134 constitute a part of the movable portion capable of moving relative to the base portion 115, and elastically support the center portion 120C of the movable plate 120. The bridge portions 131 to 134 have the same configuration, and each include a first beam portion 130a, a second beam portion 130b, and a third beam portion 130c, as shown in FIG. 6.

The first beam portion 130a linearly extends from the peripheral portion of the center portion 120C of the movable plate 120 in the X' axis direction or in the Y' axis direction, and is disposed between corresponding adjacent blade portions of the blade portions 121 to 124. The second beam portion 130b linearly extends in the X' axis direction or in the Y' axis direction, and connects the first beam portion 130a and the base portion 115.

The third beam portion 130c linearly extends in a direction intersecting the X' axis direction or the Y' axis direction, and connects an intermediate portion between the first beam portion 130a and the second beam portion 130b, and the base portion 115. Each of the bridge portions 131 to 134 includes two third beam portions 130c, and is configured so that the two third beam portions 130c in the X'Y' plane sandwich one second beam portion 130b.

The rigidity of each of the bridge portions 131 to 134 is set to an appropriate value that is capable of stably supporting the movable plate 120 that moves. In particular, the rigidity of each of the bridge portions 131 to 134 is set to an appropriate rigidity at which it can be deformed by the weight of the movable plate 120, and the magnitude of the deformation is not particularly limited as long as the gravitational acceleration by the weight of the movable plate 120 can be detected by the second acceleration detection unit 12.

As described above, the movable plate 120 is supported by the base portion 115 of the device body 110 via the four bridge portions 131 to 134, and configured to be capable of moving relative to the base portion 115 with the bridge portions 131 to 134 as fulcrums by the inertia force corresponding to the acceleration.

Figure 7A:
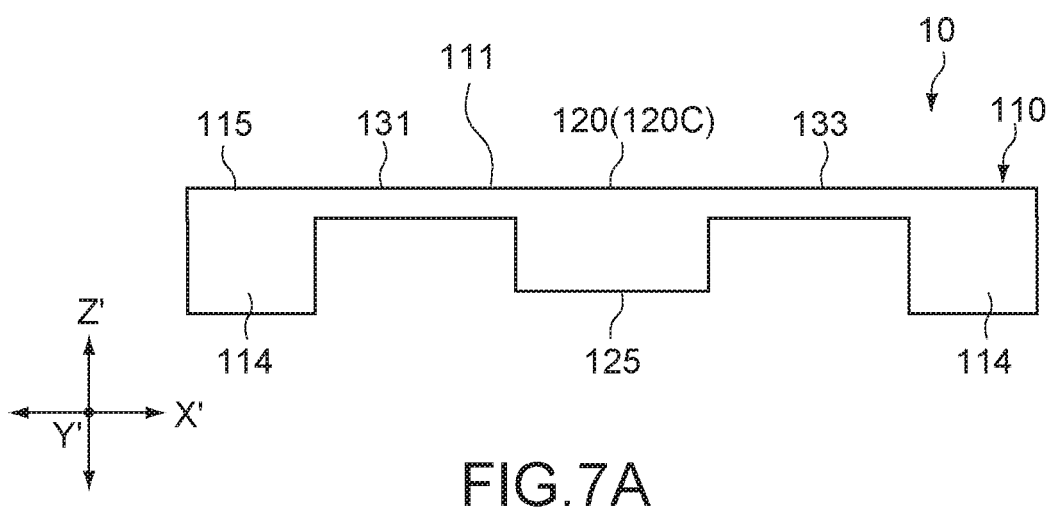
FIG. 7A is a diagram showing a state where no acceleration is applied in the acceleration sensor.
Figure 7B:
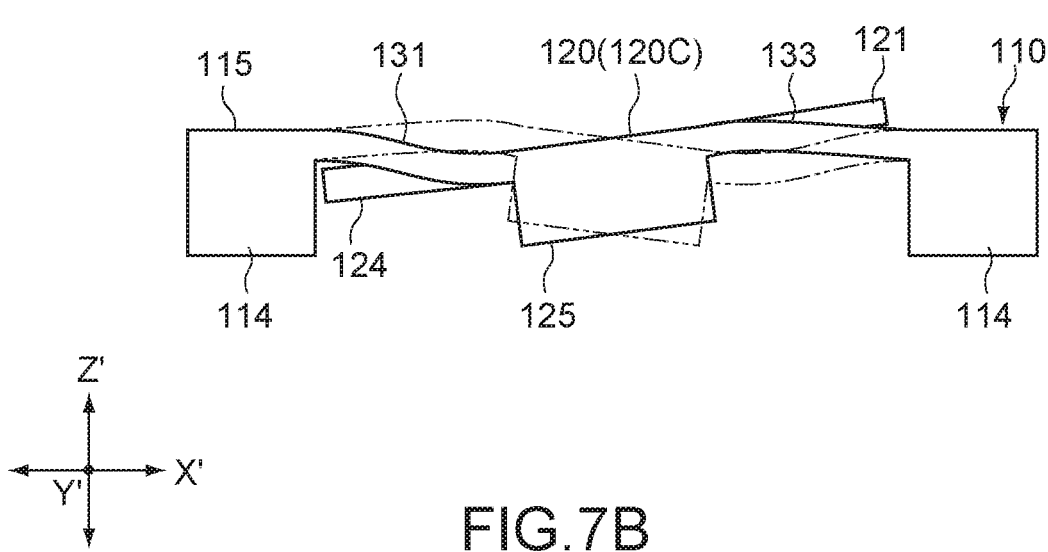
FIG. 7B is a diagram showing a state where an acceleration is generated along an X' axis direction in the acceleration sensor.
Figure 7C:
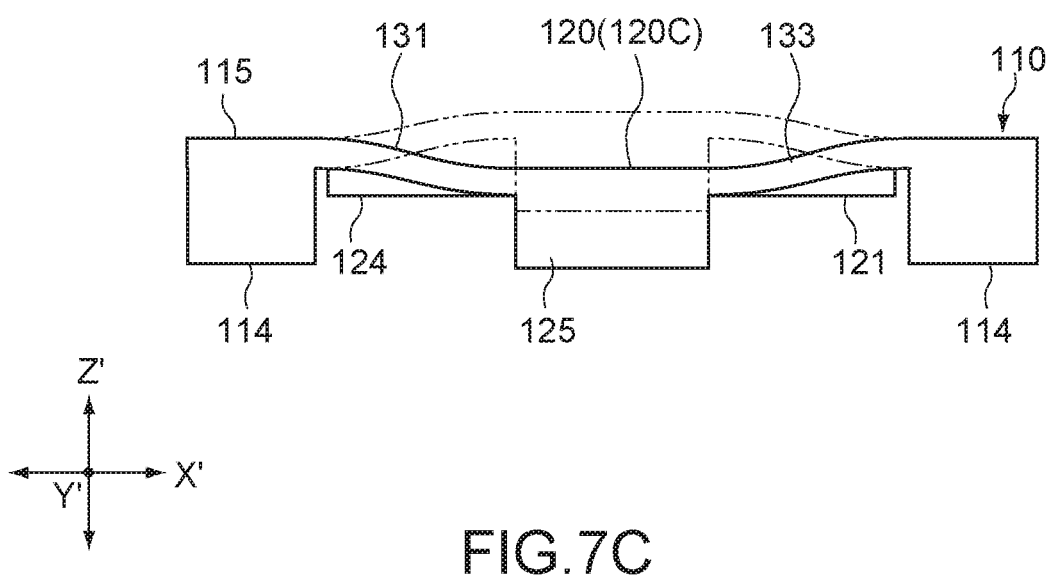
FIG. 7C is a diagram showing a state where an acceleration is generated along a Z' axis direction in the acceleration sensor.

FIG. 7A to C are each a schematic side cross-sectional view describing a state of motion of the movable plate 120. FIG. 7A is a diagram showing the state at the time when no acceleration is applied, and FIG. 7B is a diagram showing the state at the time when an acceleration along the X' axis direction is generated. Further, FIG. 7C is a diagram showing the state at the time when an acceleration along the Z' axis direction is generated.

Note that in FIG. 7B, a solid line shows the state where an acceleration is generated in the left direction of the drawing, and a broken line shows the state where an acceleration is generated in the right direction of the drawing. Further, in FIG. 7C, a solid line shows the state where an acceleration is generated in the upper direction of the drawing, and a broken line shows the state where an acceleration is generated in the lower direction of the drawing.

In the case where no acceleration is generated, the movable plate 120 is kept parallel to the front surface of the base portion 115 as shown in FIG. 7A. In the case where an acceleration along the X' axis direction is generated in this state, for example, the movable plate 120 is inclined counterclockwise about the bridge portions 132 and 134 that extend in the Y' axis direction as shown in FIG. 7B. As a result, the bridge portions 131 and 133 facing each other in the X' axis direction receive bending stress in opposite directions along in the Z' axis direction.

Similarly, in the case where an acceleration along the Y' axis direction is generated, the movable plate 120 is inclined counterclockwise (or clockwise) about the bridge portions 131 and 133 extending in the X' axis direction, and the bridge portions 132 and 134 facing each other in the Y' axis direction receive bending stress in opposite direction along the Z' axis direction, although not shown.

Meanwhile, in the case where an acceleration along the Z' axis direction is generated, the movable plate 120 moves up and down relative to the base portion 115 as shown in FIG. 7C, and each of the bridge portions 131 to 134 receives bending stress in the same direction along the Z' axis direction.

The first acceleration detection unit 11 and the second acceleration detection unit 12 are provided in each of the bridge portions 131 to 134. The acceleration sensor 10 measures the orientation and magnitude of the acceleration acting on the acceleration sensor 10 by detecting deformation of the bridge portions 131 to 134 due to the bending stress by the first acceleration detection unit 11 and the second acceleration detection unit 12.

"Configuration of Acceleration Detection Units 11 and 12"

Hereinafter, the first acceleration detection unit 11 and the second acceleration detection unit 12 will be described in detail.

As shown in FIG. 6, the first acceleration detection unit 11 include the plurality of (in this example, four) first detection devices $11x1$, $11x2$, $11y1$, and $11y2$.

The detection devices $11x1$ and $11x2$ are provided on the axial centers of the front surfaces of the two bridge portions 131 and 133 facing each other in the X' axis direction. One detection device $11x1$ is disposed on the first beam portion 130a of the bridge portion 131, and the other detection device $11x2$ is disposed on the first beam portion 130a of the bridge portion 133. Meanwhile, the detection devices $11y1$ and $11y2$ are provided on the axial centers of the front surfaces of the two bridge portions 132 and 134 facing each other in the Y' axis direction. One detection device $11y1$ is disposed on the first beam portion 130a of the bridge portion 132, and the other detection device $11y2$ is disposed on the first beam portion 130a of the bridge portion 134.

The first detection devices $11x1$ to $11y2$ have the same configuration, and each includes a rectangular piezoelectric detection device having the long side in the axial center direction of the first beam portion 130a in this embodiment. The first detection devices $11x1$ to $11y2$ each include a laminate of a lower electrode layer, a piezoelectric film, and an upper electrode layer.

The piezoelectric film is typically formed of lead zirconate titanate (PZT). It goes without saying that the present technology is not limited thereto. The piezoelectric film generates a potential difference corresponding to the amount of bending deformation (stress) of the first beam portion 130a in the Z' axis direction between the upper electrode layer and the lower electrode layer (piezoelectric effect). The upper electrode layer is electrically connected to relay terminals 140 provided on the front surface of the base portion 115 via wiring layers (not shown) formed on the bridge portions 131 to 134. The relay terminals 140 may each be configured as an external connection terminal to be electrically connected to the above-mentioned support substrate. For example, one end of bonding wire whose other end is connected to the above-mentioned support substrate is connected thereto. The lower electrode layer is typically connected to a reference potential such as a ground potential.

Since the first acceleration detection unit 11 configured as described above performs output only when the stress changes due to the characteristics of the piezoelectric film and does not perform output in the state where the stress value does not change even in the case where stress is applied, the first acceleration detection unit 11 mainly detects the magnitude of the motion acceleration acting on the movable plate 120. Therefore, the output of the first acceleration detection unit 11 mainly includes the output signal having an alternating current waveform that is an AC component corresponding to the motion acceleration.

Meanwhile, as shown in FIG. 6, the second acceleration detection unit 12 includes the plurality of (in this example, four) second detection devices 12$x$1, 12$x$2, 12$y$1, and 12$y$2.

The detection devices 12$x$1 and 12$x$2 are provided on the axial centers of the front surfaces of the two bridge portions 131 and 133 facing each other in the X' axis direction. One detection device 12$x$1 is disposed on the second beam portion 130$b$ of the bridge portion 131, and the other detection device 12$x$2 is disposed on the second beam portion 130$b$ of the bridge portion 133. Meanwhile, the detection devices 12$y$1 and 12$y$2 are provided on the axial centers of the front surfaces of the two bridge portions 132 and 134 facing each other in the Y' axis direction. One detection device 12$y$1 is disposed on the second beam portion 130$b$ of the bridge portion 132, and the other detection device 12$y$2 is disposed on the second beam portion 130$b$ of the bridge portion 134.

The second detection devices 12$x$1 to 12$y$2 have the same configuration, and each include a piezoresistive detection device having the long side in the axis center direction of the second beam portion 130$b$ in this embodiment. The second detection devices 12$x$1 to 12$y$2 each include a resistance layer and a pair of terminal portions connected to both ends the resistance layer in the axial direction.

The resistance layer is, for example, a conductor layer formed by doping the front surface (silicon layer) of the second beam portion 130$b$ with an impurity element, and generates a resistance change corresponding to the amount of bending deformation (stress) of the second beam portion 130$b$ in the Z' axis direction between the pair of terminal portions (piezoresistive effect). The pair of terminal portions are electrically connected to the relay terminals 140 provided on the front surface of the base portion 115 via wiring layers (not shown) formed on the bridge portions 131 to 134.

Since the second acceleration detection unit 12 configured as described above detects not only the motion acceleration acting on the movable plate 120 but also the gravitational acceleration acting on the movable plate 120, because the resistance value is determined by the absolute stress value due to the characteristics of the piezo resistance. Therefore, the output of the second acceleration detection unit 11 has an output waveform in which the dynamic component (AC component) corresponding to the motion acceleration is superimposed on the gravitational acceleration or static component (DC component) corresponding thereto.

Note that the present technology is not limited to the example in which the second detection devices 12$x$1 to 12$y$2 each include a piezoresistive detection device. The second detection devices 12$x$1 to 12$y$2 may each include, for example, another non-piezoelectric detection device capable of detecting the acceleration of the DC component, such as an electrostatic one. In the case of the electrostatic one, a movable electrode portion and a fixed electrode portion constituting a pair of electrodes are disposed to face each other in the axial direction of the second beam portion 130$b$, and are configured so that the facing distance between the both electrode portions changes corresponding to the above-mentioned amount of bending deformation of the second beam portion 130$b$.

Since the piezoelectric acceleration sensor 10 is adopted as the first acceleration detection unit 11 and the non-piezoelectric (piezoresistive or capacitive) acceleration sensor 10 is adopted as the second acceleration detection unit 12, it is possible to achieve an inertial sensor with a wide dynamic range and high sensitivity in a low frequency region.

The first acceleration detection unit 11 outputs acceleration detection signals (Acc-AC-x, Acc-AC-y, and Acc-AC-z) in the X' axis direction, the Y' axis direction, and the Z' axis direction to the signal processing circuit 20 on the basis of output of the first detection devices 11$x$1 to 11$y$2 (see FIG. 3).

The acceleration detection signal (Acc-AC-x) in the X' axis direction corresponds to a difference signal (ax1−ax2) between output (ax1) of detection device 11$x$1 and output (ax2) of the detection device 11$x$2. The acceleration detection signal (Acc-AC-y) in the Y' axis direction corresponds to a difference signal (ay1−ay2) between output (ay1) of the detection device 11$y$1 and output (ay2) of the detection device 11$y$2. Then, the acceleration detection signal (Acc-AC-z) in the Z' axis direction corresponds to the sum (ax1+ax2+ay1+ay2) of output of the detection devices 11$x$1 to 11$y$2.

Similarly, the second acceleration detection unit 12 outputs the acceleration detection signals (Acc-DC-x, Acc-DC-y, and Acc-DC-z) in the X' axis direction, the Y' axis direction, and the Z' axis direction to the controller 20 on the basis of output of the second detection devices 12$x$1 to 12$y$2 (see FIG. 3).

The acceleration detection signal (Acc-DC-x) in the X' axis direction corresponds to a difference signal (bx1−bx2) between output (bx1) of the detection device 12$x$1 and output (bx2) of the detection device 12$x$2. The acceleration detection signal (Acc-DC-y) in the Y' axis direction corresponds to a difference signal (by1−by2) between output (by1) of the detection device 12$y$1 and output (by2) of the detection device 12$y$2. Then, the acceleration detection signal (Acc-DC-z) in the Z' axis direction corresponds to the sum (bx1+bx2+by1+by2) of output of the detection devices 12$x$1 to 12$y$2.

"Configuration of Acceleration Calculation Unit 200"

Figure 8:
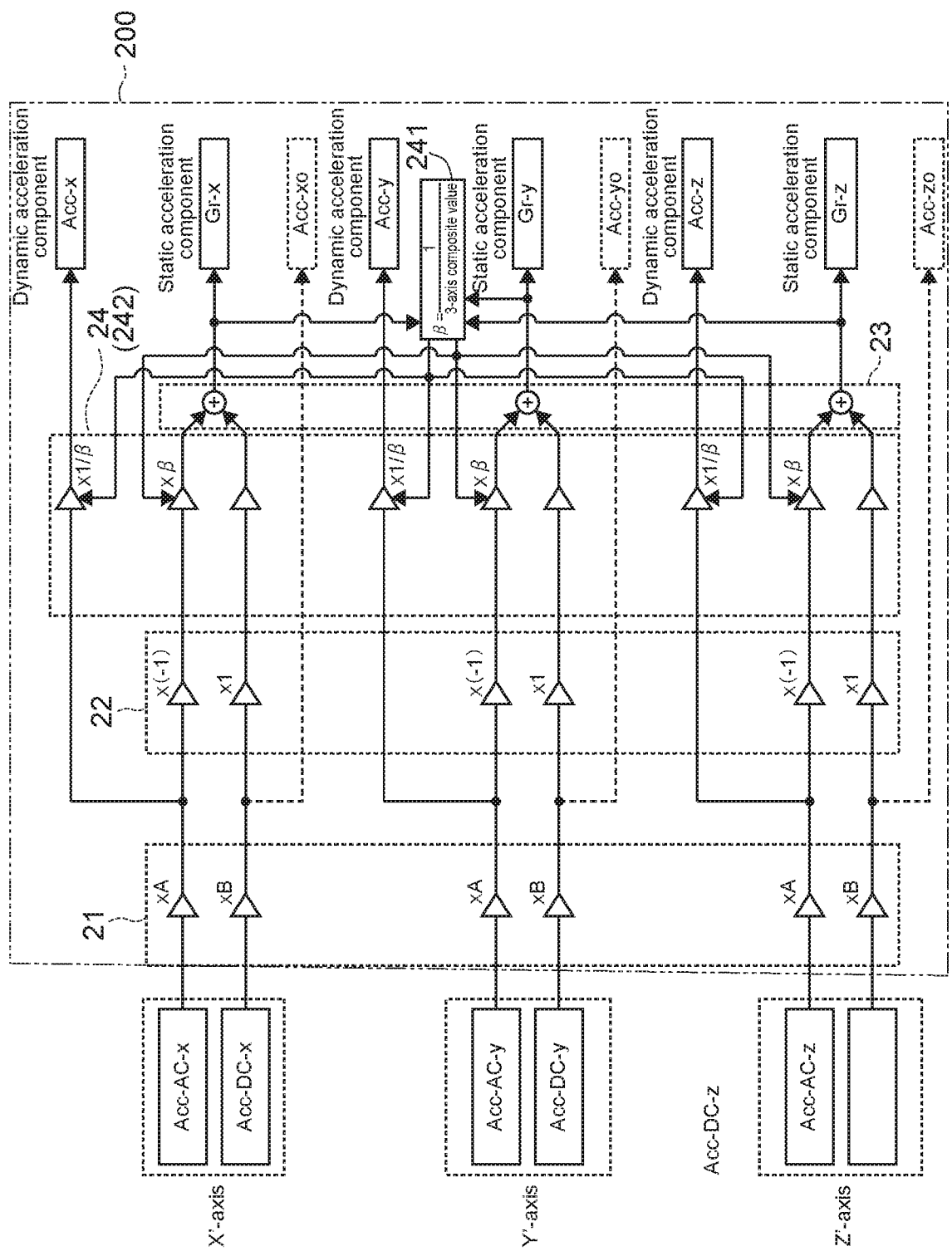
FIG. 8 is a circuit diagram showing a configuration example of an acceleration calculation unit.

Next, the configuration of the acceleration calculation unit 200 of the controller 20 in the sensor unit 40 will be described. FIG. 8 is a circuit diagram showing a configuration example of the acceleration calculation unit 200.

The acceleration calculation unit 200 includes a gain adjustment circuit 21, a sign inversion circuit 22, an addition circuit 23, and a correction circuit 24. These circuits 21 to 24 have a common configuration for each axis of X', Y', and Z', and perform common arithmetic processing on each axis, so that a dynamic acceleration component (motion acceleration component) and a static acceleration component (gravitational acceleration component) of each axis are computed.

Figure 9:
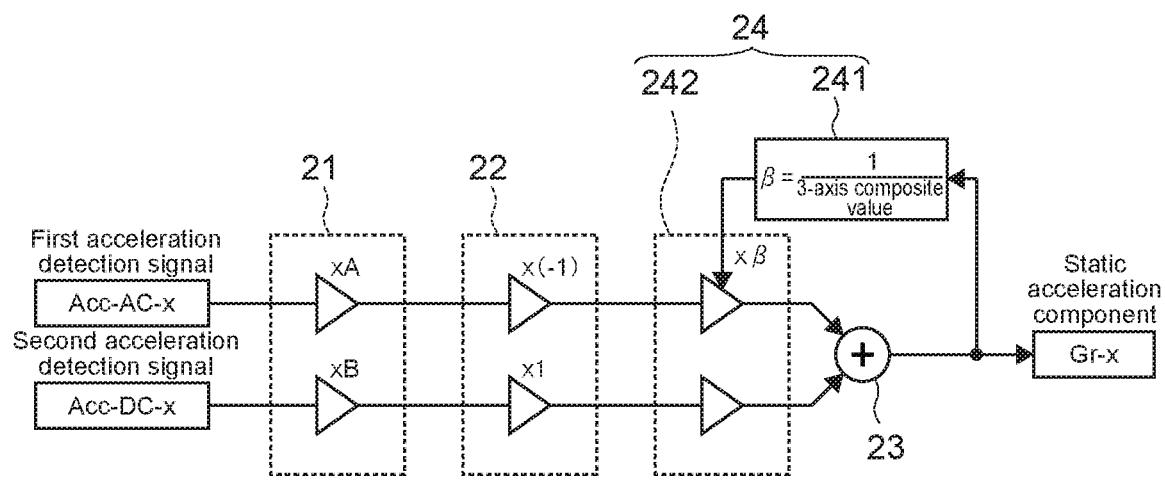
FIG. 9 is a diagram showing a processing block that computes a static acceleration component from an acceleration detection signal in an X' axis direction.

Hereinafter, as a representative example, a processing circuit for an acceleration detection signal in the X' axis direction will be described. FIG. 9 shows a processing block for computing a static acceleration component from an acceleration detection signal in the X' axis direction.

The gain adjustment circuit 21 adjusts gain of each signal so that the first acceleration detection signal (Acc-AC-x) in the X' axis direction output from the first acceleration detection unit 11 (11$x$1 and 11$x$2) and the second acceleration detection signal (Acc-DC-x) in the X' axis direction output from the second acceleration detection unit 12 (12$x$1 and 12$x$2) are mutually at the same level. The gain adjustment circuit 21 includes an amplifier for amplifying the output (Acc-AC-x) of the first acceleration detection unit 11 and the output (Acc-DC-x) of the second acceleration detection unit 12.

Figure 10:
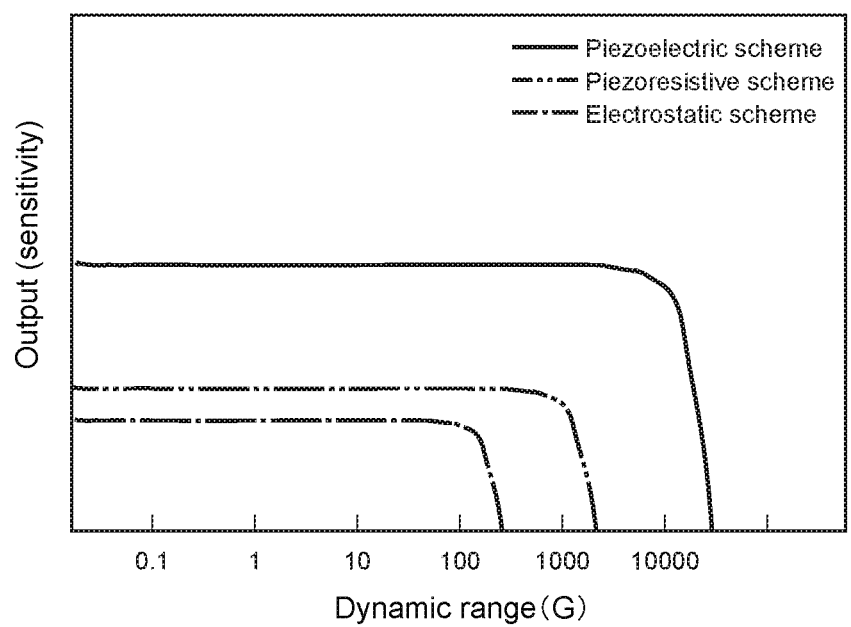
FIG. 10 is a diagram describing an operation of the acceleration calculation unit.

In general, output sensitivity and a dynamic range of the acceleration sensor 10 differ depending on the detection scheme. For example, as shown in FIG. 10, the output sensitivity is high and the dynamic range is wide (large) in a piezoelectric acceleration sensor 10 than in a non-piezoelectric (piezoresistive or electrostatic) acceleration sensor 10. In this embodiment, the first acceleration detection unit 11 corresponds to a piezoelectric acceleration sensor 10, and the second acceleration detection unit 12 corresponds to a piezoresistive acceleration sensor 10.

In this regard, the gain adjustment circuit 21 amplifies the outputs of the respective acceleration detection units 11 and 12 (first and second acceleration detection signals) by A and B times, respectively, so that the outputs of the acceleration detection units 11 and 12 have the same level. The amplification factors A and B are positive numbers and satisfy a relationship of A<B. The values of the amplification factors A and B are not particularly limited, and may be set as coefficients that serve as temperature compensation of the acceleration detection units 11 and 12 depending on the use environment (use temperature) of the acceleration sensor 10.

Figure 11:
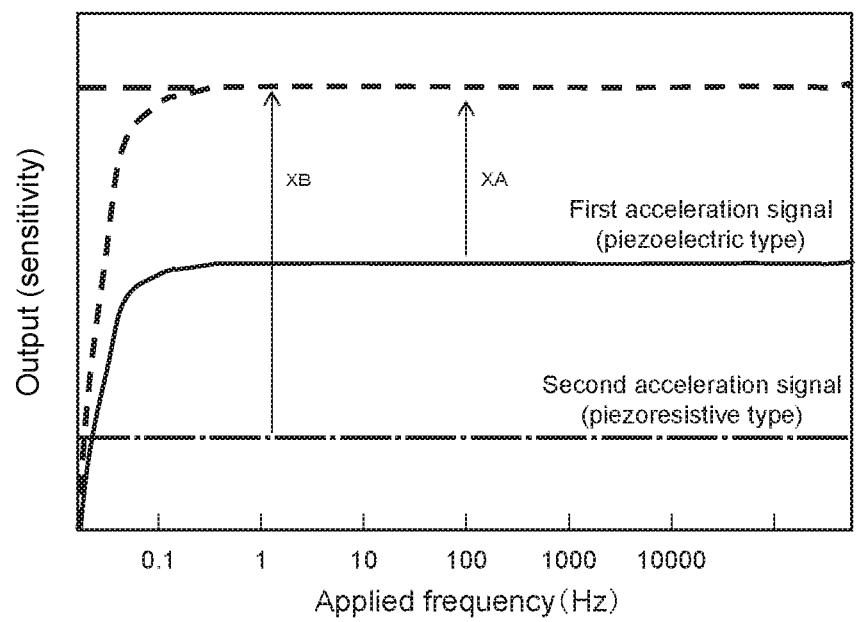
FIG. 11 is a diagram describing an operation of the acceleration calculation unit.

FIG. 11 is an example of output characteristics of the first acceleration detection signal and the second acceleration detection signal, and shows the output characteristic before gain adjustment and the output characteristic after gain adjustment in comparison. In the figure, a horizontal axis indicates a frequency of the acceleration acting on the acceleration sensor 10, and a vertical axis indicates the output (sensitivity) (the same is applied to FIG. 12 to FIG. 15).

As shown in FIG. 11, in a first acceleration detection signal (Acc-AC-x) of a piezoelectric scheme, output sensitivity of an acceleration component in a low frequency region of 0.5 Hz or less is lower than the output sensitivity of the acceleration component in a higher frequency region. In particular, the output sensitivity in a stationary state (motion acceleration 0) is approximately zero. Meanwhile, a second acceleration detection signal (Acc-DC-x) of a piezoresistive scheme has constant output sensitivity over the entire frequency range, and thus an acceleration component in a stationary state (that is, a gravitational acceleration) can be detected at constant output sensitivity. Therefore, when the gain adjustment circuit 21 amplifies the first acceleration detection signal and the second acceleration detection signal at predetermined magnifications, respectively, to obtain the same output level, it is possible to compute a gravitational acceleration component in a difference calculation circuit described below.

The sign inversion circuit 22 and the addition circuit 23 constitute a difference calculation circuit that computes a static acceleration component (DC component) from the acceleration of each axis direction on the basis of a difference signal between the first acceleration detection signal (Acc-AC-x) and the second acceleration detection signal (Acc-DC-x).

Figure 12:
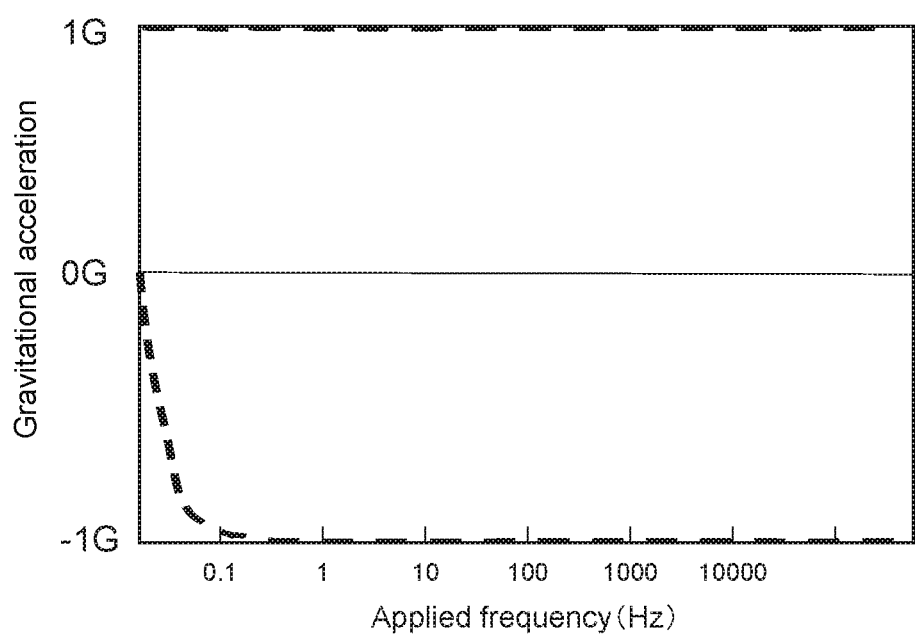
FIG. 12 is a diagram describing an operation of the acceleration calculation unit.

The sign inversion circuit 22 has an inversion amplifier (amplification factor: −1) that inverts the sign of the first acceleration detection signal (Acc-AC-x) after gain adjustment. FIG. 12 shows an example of an output characteristic of the first acceleration detection signal (Acc-AC-x) after sign inversion. Here, a case in which the acceleration sensor 10 detects an acceleration of 1 G in the X' axis direction is shown as an example.

Note that the second acceleration detection signal (Acc-DC-x) is output to the addition circuit 23 in a subsequent stage without inverting the sign thereof. The sign inversion circuit 22 may be configured in common with the gain adjustment circuit 21 in a preceding stage.

Figure 13:
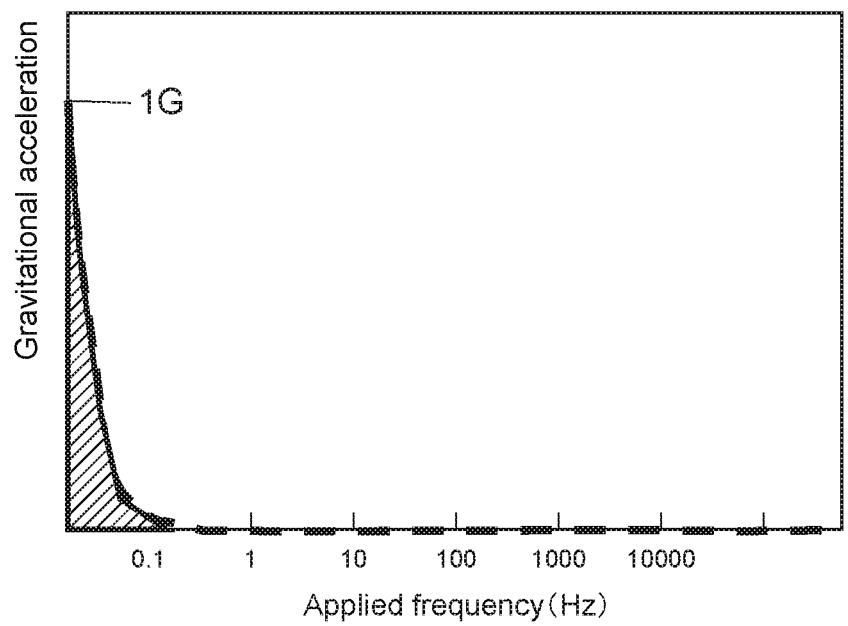
FIG. 13 is a diagram describing an operation of the acceleration calculation unit.

The addition circuit 23 adds the first acceleration detection signal (Acc-AC-x) and the second acceleration detection signal (Acc-DC-x) output from the sign inversion circuit 22 to output a static acceleration component. FIG. 13 shows an example of an output characteristic of the addition circuit 23. Since the first and second acceleration detection signals are adjusted to the same level in the gain adjustment circuit 21, a net static acceleration component (Gr-x) can be computed by obtaining a difference signal thereof. The static acceleration component typically corresponds to a gravitational acceleration component or an acceleration component including the gravitational acceleration.

Figure 14:
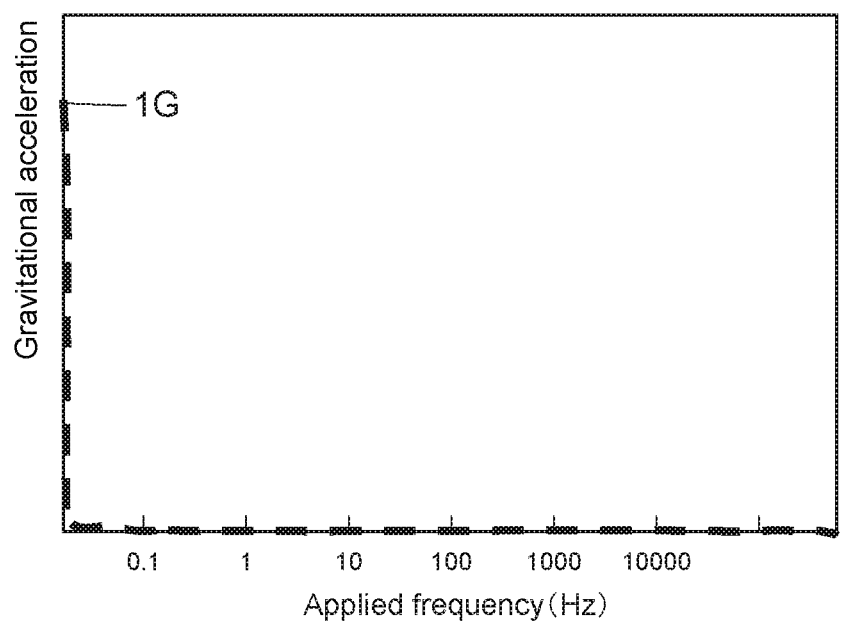
FIG. 14 is a diagram describing an operation of the acceleration calculation unit.

When the static acceleration component output from the addition circuit 23 corresponds to only a gravitational acceleration, theoretically, an output of a significant acceleration component appears only near 0 Hz as shown in FIG. 14. However, in practice, since detection sensitivity in the vicinity of a low frequency of the first acceleration detection unit 11 having a piezoelectric detection type is low, and acceleration components in axis directions (here, the Y' axis direction and the Z' axis direction) other than a target axis unavoidably superimpose due to generation of sensitivities of other axes, a dynamic acceleration component in a frequency domain indicated by hatching in FIG. 13 leaks into an output of the addition circuit 23 as an error component. In this regard, in this embodiment, the correction circuit 24 for canceling the error on the basis of the output of the addition circuit 23 is provided.

The correction circuit 24 includes a 3-axis composite value calculation unit 241 and a low band sensitivity correction unit 242. The correction circuit 24 computes a correction coefficient β on the basis of the output of the addition circuit 23 (the difference signal between the first and second acceleration detection signals), and corrects the first acceleration detection signal (Acc-AC-x) using the correction coefficient β.

The 3-axis composite value calculation unit 241 is commonly provided for processing blocks that compute static acceleration components in all the X' axis, Y' axis, and Z' axis directions, and computes the correction coefficient β using a sum value of the output (the difference signal between the first and second acceleration detection signals) of the addition circuit 23 in each axis.

Specifically, the 3-axis composite value calculation unit 241 computes a composite value ($\sqrt{((Gr-x)^2+(Gr-y)^2+(Gr-z)^2)}$) of the static acceleration components (Gr-x, Gr-y, and Gr-z) in the three axis directions, and regards a portion of the composite value exceeding 1 G as a low band sensitivity error portion (area indicated by hatching in FIG. 13) to compute the correction coefficient β corresponding to a reciprocal of the composite value.

$$\beta=1/\sqrt{((Gr-x)^2+(Gr-y)^2+(Gr-z)^2)}$$

Note that values of the static acceleration components (Gr-x, Gr-y, and Gr-z) in the three respective axis directions differ depending on the posture of the acceleration sensor 10, and momentarily change corresponding to posture change of the acceleration sensor 10. For example, when the z-axis direction of the acceleration sensor 10 coincides with a gravity direction (Z axis direction), the static acceleration component (Gr-z) in the z-axis direction indicates a larger value than the static acceleration components (Gr-x, and Gr-y) in the x-axis direction and the y-axis direction. In this way, it is possible to determine the gravity direction of the acceleration sensor 10 at the time from the values of the static acceleration components (Gr-x, Gr-y, and Gr-z) in the three respective axis directions.

The low band sensitivity correction unit 242 has a multiplier that multiplies the correction coefficient β by the first acceleration detection signal (Acc-AC-x) whose sign is inverted. In this way, the first acceleration detection signal is input to the addition circuit 23 in a state in which a low band sensitivity error is reduced, and thus an acceleration signal having a frequency characteristic shown in FIG. 14 is output from the addition circuit 23. In this way, since only the gravitational acceleration corresponding to the gravitational acceleration is output, computation accuracy of the gravitational acceleration component is improved.

In this embodiment, the correction circuit 24 is configured to execute a process of multiplying the first acceleration detection signal by the correction coefficient β at the time of calculating the static acceleration component. However, the present technology is not limited thereto. The correction circuit 24 may be configured to execute a process of multiplying the second acceleration detection signal (Acc-DC-x) by the correction coefficient β, or the acceleration detection signal to be corrected may be switched between the first acceleration detection signal and the second acceleration detection signal corresponding to a magnitude of an acceleration change.

The correction circuit 24 is configured to correct the first acceleration detection signal using the correction coefficient β when the change in acceleration of either one of the first acceleration detection signal and the second acceleration detection signal is greater than or equal to a predetermined value. The larger the change in acceleration (the higher an applied frequency), the higher a rate at which an error component leaks into the first acceleration detection signal. Thus, the error component can be efficiently reduced. The configuration is particularly effective when the motion acceleration is relatively large.

Meanwhile, the correction circuit 24 is configured to correct the second acceleration detection signal using the correction coefficient β when the change in acceleration of either one of the first acceleration detection signal and the second acceleration detection signal is less than or equal to a predetermined value. The smaller the change in acceleration (the lower the applied frequency), the higher a rate at which the error component leaks into the second acceleration detection signal. Thus, the error component can be efficiently reduced. The configuration is particularly effective when the motion acceleration is relatively small.

The static acceleration component in each axis direction is computed as described above. However, for computation of the dynamic acceleration components (Acc-x, Acc-y, and Acc-z) in the respective axis direction, as illustrated in FIG. 8, the first acceleration detection signals (Acc-AC-x, Acc-AC-y, and Acc-AC-z) whose gains are adjusted in the gain adjustment circuit 21 are referred to.

Here, even though the first acceleration detection signal may be used without change for computation of the dynamic acceleration component, since a part of the dynamic acceleration component may leak into the static acceleration component as described above in some cases, the dynamic acceleration component decreases, so that detection with high precision becomes difficult. In this regard, by correcting the first acceleration detection signal using the correction coefficient β computed in the correction circuit 24, it is possible to achieve the detection accuracy of the dynamic acceleration component.

Figure 15:
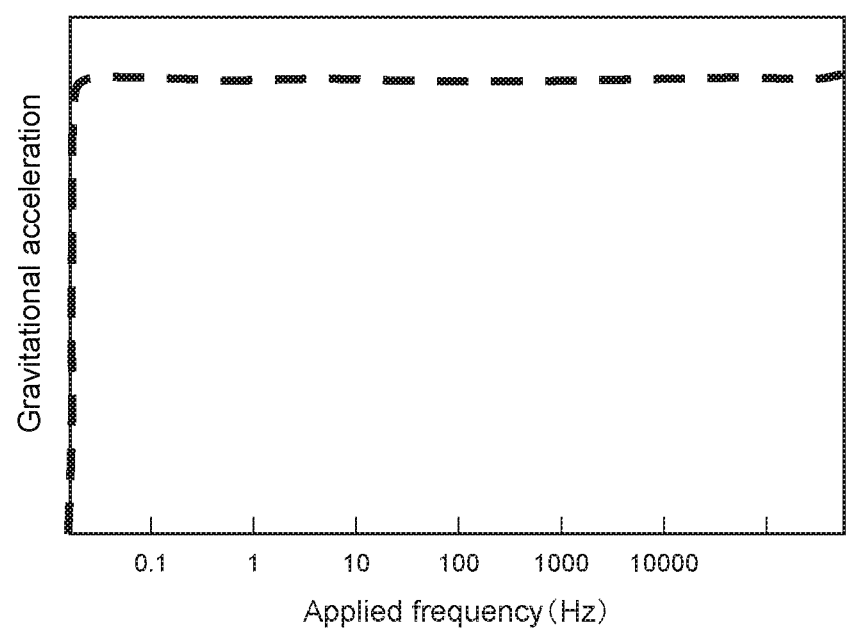
FIG. 15 is a diagram describing an operation of the acceleration calculation unit.

More specifically, as illustrated in FIG. 8, the correction circuit 24 (the low band sensitivity correction unit 242) has the multiplier that multiplies the reciprocal (1/β) of the correction coefficient β acquired by the 3-axis composite value calculation unit 241 by the first acceleration detection signals (Acc-AC-x, Acc-AC-y, and Acc-AC-z). In this way, a low band sensitivity component of the first acceleration signal is compensated, and thus the computation accuracy of the dynamic acceleration components (Acc-x, Acc-y, and Acc-z) is improved. FIG. 15 schematically shows the output characteristics of the dynamic acceleration components.

It is presumed that a process of correcting the dynamic acceleration component and the static acceleration component by the low band sensitivity correction unit 242 is typically effective when the composite value computed by the 3-axis composite value calculation unit 241 is other than 1 G (G: gravitational acceleration). Note that examples of a case in which the composite value is less than 1 G include a case in which the acceleration sensor 10 is falling free, etc.

<Description of Operation>

Figure 16:
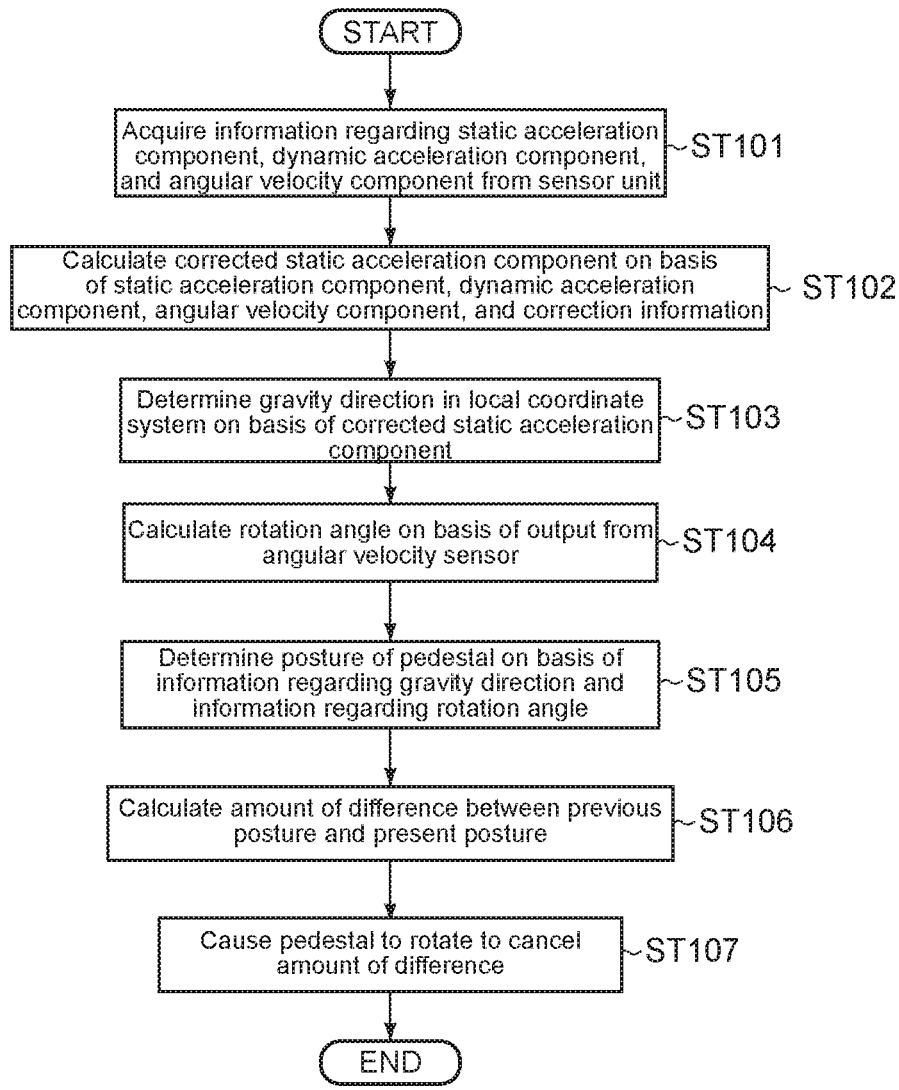
FIG. 16 is a flowchart showing processing of a control unit of the camera gimbal according to the first embodiment.

Next, processing of the control unit 61 of the camera gimbal 50 will be described. FIG. 16 is a flowchart showing processing of the control unit 61 of the camera gimbal 50 according to the first embodiment.

When the camera gimbal 50 is activated by turning on the power or the like, the control unit 61 acquires, at a predetermined clock cycle, information regarding the static acceleration components (Gr-x, Gr-y, and Gr-z), the dynamic acceleration components (Acc-x, Acc-y, and Acc-z), and the angular velocity components ($\omega_x$, $\omega_y$, and $\omega_z$) output from the sensor unit 40 provided to the pedestal 56 (Step 101).

Next, the control unit 61 computes corrected static acceleration components (Gr-x', Gr-y', and Gr-z') on the basis of the nine elements, i.e., the static acceleration components (Gr-x, Gr-y, and Gr-z), the dynamic acceleration components (Acc-x, Acc-y, and Acc-z), and the angular velocity components ($\omega_x$, $\omega_y$, and $\omega_z$), and correction information for correcting the static acceleration components (Step 102).

In this case, for example, the control unit 61 executes a matrix calculation of $Y^T = MX^T$ by a matrix M (correction information) of nine rows and three columns, and a transposed matrix $X^T$ of vectors of the nine elements (Gr-x, Gr-y, Gr-z, Acc-x, Acc-y, Acc-z, $\omega_x$, $\omega_y$, and $\omega_z$) to acquire a transposed matrix $Y^T$ of the corrected static acceleration components (Gr-x', Gr-y', and Gr-z').

Alternatively, the control unit 61 executes a matrix calculation of $Y^T = NX^T + Z^T$ by a matrix N (correction information), a transposed matrix $X^T$, and a transposed matrix $Z^T$ of the static acceleration components (Gr-x, Gr-y, and Gr-z) (before correction) to acquire the transposed matrix $Y^T$ of corrected static acceleration components (Gr-x', Gr-y', and Gr-z').

Note that in this embodiment, the matrix M and the matrix N are values prepared in advance, and stored in the storage unit 62. In this embodiment, the matrix M and the matrix N are each correction information for correcting the static acceleration components (Gr-x, Gr-y, and Gr-z) by the dynamic acceleration components (Acc-x, Acc-y, and Acc-z) and the angular velocity components ($\omega_x$, $\omega_y$, and $\omega_z$). Note that although the static acceleration component is corrected by both the dynamic acceleration component and the angular velocity component in this embodiment, the static acceleration component may be corrected by one of the dynamic acceleration component and the angular velocity component.

When the transposed matrix $Y^T$ is acquired, the control unit 61 acquires the corrected static acceleration components (Gr-x', Gr-y', and Gr-z') on the basis of the transposed matrix $Y^T$.

Note that the nine elements (Gr-x, Gr-y, Gr-z, Acc-x, Acc-y, Acc-z, $\omega_x$, $\omega_y$, and $\omega_z$) used when acquiring the corrected static acceleration components (Gr-x', Gr-y', and Gr-z') may be a set of nine elements of the current time or a plurality of sets of nine elements of a period from a predetermined time before the current time to the current time.

When the corrected static acceleration components are computed, then, the control unit 61 determines the gravity direction in the local coordinate system on the basis of the corrected static acceleration components (Gr-x', Gr-y', and Gr-z') (Step 103). In this case, typically, the control unit 61 determines that the direction in which the vector of the composite value ($\sqrt{((Gr\text{-}x')^2+(Gr\text{-}y')^2+(Gr\text{-}z')^2)}$) of the corrected static acceleration components is directed is the gravity direction in the local coordinate system.

Although the case where the gravity direction is determined on the basis of the corrected static acceleration components (Gr-x', Gr-y', and Gr-z') will be described in the description of this embodiment, the gravity direction may be determined on the basis of static acceleration components (Gr-x, Gr-y, and Gr-z) that have not been corrected (the same applies to each embodiment described below). In this case, the control unit 61 determines that the direction in which the vector of the composite value ($\sqrt{((Gr\text{-}x)^2+(Gr\text{-}y)^2+(Gr\text{-}z)^2)}$) of the static acceleration components is directed is the gravity direction in the local coordinate system.

Next, the control unit 61 computes rotation angles ($\theta_x$, $\theta_y$, and $\theta_z$) in the local coordinate system on the basis of the outputs ($\omega_x$, $\omega_y$, and $\omega_z$) from the angular velocity sensor 30 (Step 104).

Next, the control unit 61 determines the current posture of the pedestal 56 in the global coordinate system on the basis of the information regarding the gravity direction in the local coordinate system and the information regarding the rotation angle in the local coordinate system (Step 105).

Next, the control unit 61 computes the amount of difference between the current posture of the pedestal 56 in the global coordinate system and the previous posture of the pedestal 56 in the global coordinate system (Step 106). That is, the control unit 61 computes the amount of difference necessary for maintaining the posture of the pedestal 56.

Next, the control unit 61 rotates the pedestal 56 around the three axes (X', Y', and Z' axes) so as to cancel the amount of difference (Step 107). At this time, the control unit 61 issues a command to the first motor 63a as necessary to rotate the first rotation member 53 around the z axis with respect to the shaft portion 52. Similarly, the control unit 61 issues a command to the second motor 63b as necessary to rotate the second rotation member 54 around the y axis with respect to the first rotation member 53, and issues a command to the third motor 63c to rotate the pedestal 56 around the x axis with respect to the pedestal holding member 55. In this way, the initial posture is maintained by the rotation of the pedestal 56.

<Operation, etc.>

As described above, in this embodiment, the static acceleration component is computed from the two signals, i.e., the first acceleration detection signal acquired by detecting the dynamic acceleration component acting on the pedestal 56 (camera) and the second acceleration detection signal acquired by detecting the dynamic acceleration component and the static acceleration component acting on the pedestal 56 (camera).

Therefore, it is possible to accurately compute the static acceleration component that can be regarded as the gravitational acceleration component. Therefore, in this embodiment, since the control unit 61 is capable of accurately determining the gravity direction of the pedestal 56 (camera) in the local coordinate system, it is possible to accurately determine the posture of the pedestal 56 (camera) in the global coordinate system. Therefore, the control unit 61 is capable of accurately controlling the posture of the pedestal 56 (camera) in the global coordinate system.

Now, a case where a general acceleration sensor is used will be described as a comparison. In the general acceleration sensor, the acceleration of addition of the dynamic acceleration component (motion acceleration component) and the static acceleration component (gravitational acceleration component) can be detected. However, the static acceleration component cannot be computed from the acceleration acquired by the addition. Although it is conceivable to compute, from the acceleration acquired by addition, the static acceleration component by using a low-pass filter or the like, the precision in computing the static acceleration component is insufficient.

Therefore, in the general acceleration sensor, for example, in the case where the pedestal 56 (camera) has moved largely, the direction of the acceleration of addition of the dynamic acceleration component (motion acceleration component) and the static acceleration component (gravitational acceleration component) is erroneously recognized as the gravity direction in some cases. In this case, there is a problem that an image captured by the camera is blurred or an object deviated from the angle of view.

Meanwhile, in this embodiment, the static acceleration component (gravitational acceleration component) can be accurately computed as described above. Therefore, even in the case where the pedestal 56 (camera) has moved largely, it is possible to accurately determine the gravity direction in the local coordinate system on the basis of the computed static acceleration component. Therefore, also in such a case, the control unit 61 is capable of accurately determining the posture of the pedestal 56 (camera) in the global coordinate system, and accurately controlling the posture of the pedestal 56 (camera). As a result, it is possible to prevent an image from being blurred or an object from deviating from the angle of view.

Further, in this embodiment, the static acceleration component is corrected on the basis of correction information for correcting the static acceleration component by the dynamic acceleration component and the angular velocity component. Then, since the gravity direction is determined on the basis of the corrected static acceleration components (Gr-x', Gr-y', and Gr-z'), it is possible to further improve the precision of the determination of the gravity direction, and further accurately control the posture of the pedestal 56 (camera).

Second Embodiment

Next, a second embodiment of the present technology will be described. In the description of the second embodiment and subsequent embodiments, components having configurations and functions similar to those in the above-mentioned first embodiment will be denoted by the same reference symbols and description thereof will be omitted or simplified.

Figure 17:
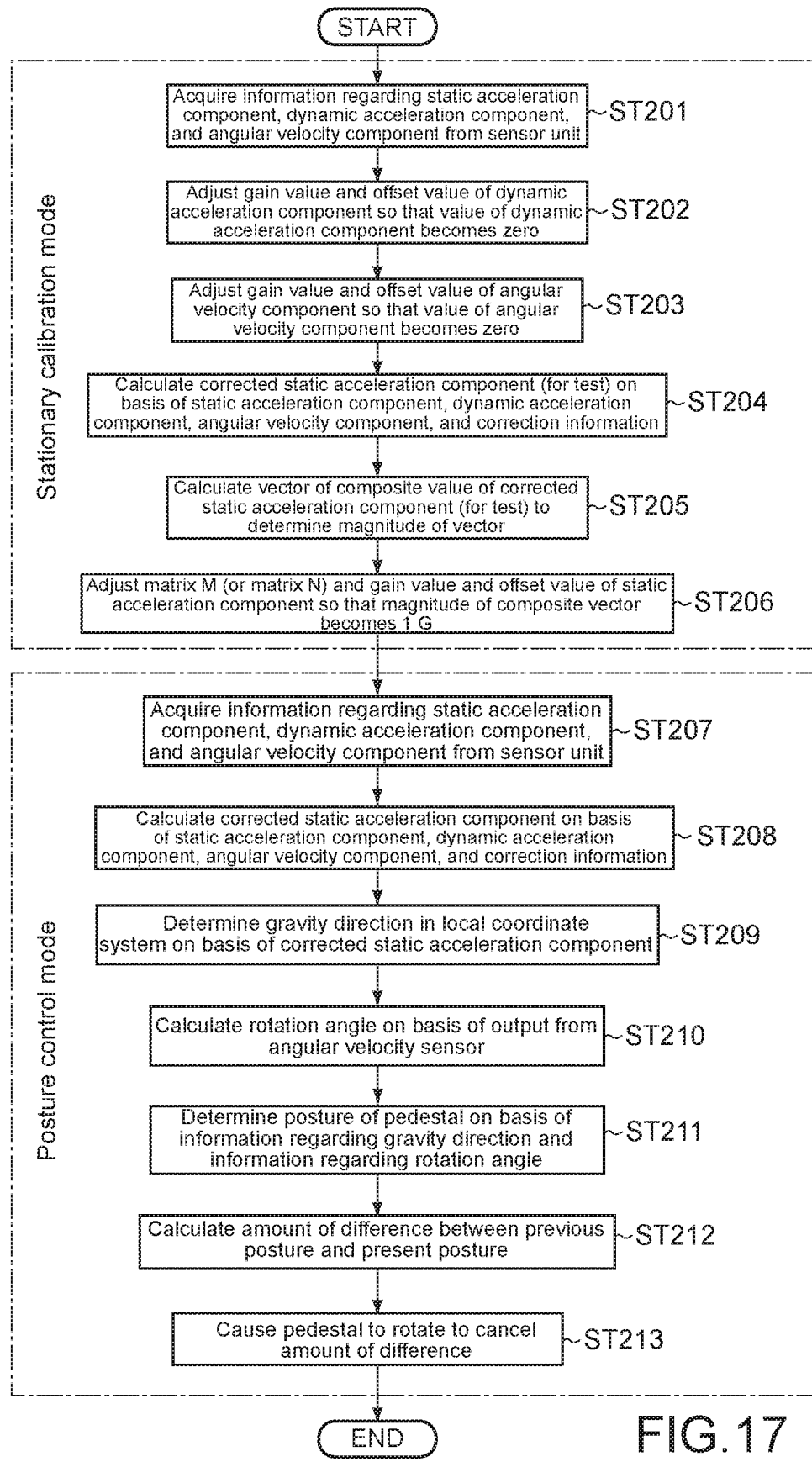
FIG. 17 is a flowchart showing processing of a control unit of a camera gimbal according to a second embodiment.

FIG. 17 is a flowchart showing processing of the control unit 61 of the camera gimbal 50 according to the second embodiment.

When the camera gimbal 50 is activated by turning on the power or the like, the control unit 61 executes a stationary calibration mode first (see Step 201 to Step 206). In the stationary calibration mode, a user makes the camera gimbal 50 have the basic posture, places the camera gimbal 50 at a certain place, and keeps the camera gimbal 50 stationary.

In the stationary calibration mode, first, the control unit 61 acquires, at a predetermined clock cycle, information regarding the dynamic acceleration component and the angular velocity component output from the sensor unit 40 in the stationary state (Step 201).

Next, the control unit 61 adjusts (generates) a gain value and an offset value of the dynamic acceleration component so that values of the dynamic acceleration components (Acc-x, Acc-y, and Acc-z) are each zero (Step 202).

Next, the control unit 61 adjusts (generates) a gain value and an offset value of the angular velocity component so that values of the angular velocity components ($\omega_x$, $\omega_y$, and $\omega_z$) are each zero (Step 203).

Next, the control unit 61 computes, for a test, corrected static acceleration components (Gr-x', Gr-y', and Gr-z') for a test on the basis of the nine elements, i.e., the static acceleration components (Gr-x, Gr-y, and Gr-z), the dynamic acceleration components (Acc-x, Acc-y, and Acc-z), and the angular velocity components ($\omega_x$, $\omega_y$, and $\omega_z$), and the correction information for correcting the static acceleration components (Step 204).

In Step 204, for example, the control unit 61 executes a matrix calculation of $Y^T=MX^T$ to acquire the transposed matrix $Y^T$ of the corrected static acceleration components (for a test). Alternatively, the control unit 61 executes a matrix calculation of $Y^T=NX^T+Z^T$ to acquire the transposed matrix $Y^T$ of the corrected static acceleration components (for a test). Then, the control unit 61 acquires, from the obtained transposed matrix $Y^T$, the corrected static acceleration components (for a test).

Here, the nine elements (Gr-x, Gr-y, Gr-z, Acc-x, Acc-y, Acc-z, $\omega_x$, $\omega_y$, and $\omega_z$) used when acquiring the corrected static acceleration components (for a test) may be a set of nine elements of the current time or a plurality of sets of nine elements of a period from a predetermined time before the current time to the current time.

When the corrected static acceleration components (for a test) are computed, then, the control unit 61 computes, in the local coordinate system, the vector of the composite value ($\sqrt{((Gr-x')^2+(Gr-y')^2+(Gr-z')^2)}$) of the corrected static acceleration components (for a test) to determine the magnitude of the vector (Step 205).

Next, the control unit 61 adjusts (generates) the matrix M (or the matrix N) and a gain value and an offset value of the static acceleration component so that the magnitude of the vector of the composite value is 1 G (Step 206). In this embodiment, the matrix M (or the matrix N) and the gain value and the offset value of the static acceleration component are each correction information for correcting the static acceleration component.

When the stationary calibration mode is finished, then, the control unit 61 executes a the posture control mode that controls the posture of the camera in the camera gimbal 50 (see Step 207 to Step 213).

In the posture control mode, the control unit 61 executes processing similar to that in Step 101 to Step 107 in FIG. 16 of the first embodiment. Note that in the second embodiment, the matrix M (or the matrix N), the gain value, and the offset value (see Step 206) adjusted in the stationary calibration mode are used in Step 208 as the correction information for correcting the static acceleration component.

In the second embodiment, in the stationary calibration mode, the matrix M (or the matrix N) and the gain value and the offset value of the static acceleration component are adjusted so that the magnitude of the vector of the composite value of the corrected static acceleration components (for a test) is 1 G. Then, in the posture control mode, since the matrix M (or the matrix N) and the gain value and the offset value of the static acceleration component (i.e., correction information) adjusted in the stationary calibration mode are used for computing the corrected static acceleration components, it is possible to determine the gravity direction with higher precision.

Third Embodiment

Next, a third embodiment of the present technology will be described. The third embodiment is different from the above-mentioned embodiments in that the camera gimbal 50 is attached to an unmanned flight vehicle (the flight vehicle may be a manned plane, a helicopter, or the like) such as a drone.

Note that in the third embodiment, instead of the grip portion 51 in the camera gimbal 50, a connection portion not shown) to be connected to the drone is provided to the camera gimbal 50. Further, a communication unit that communicates with the drone is provided to the camera gimbal 50.

Figure 18:
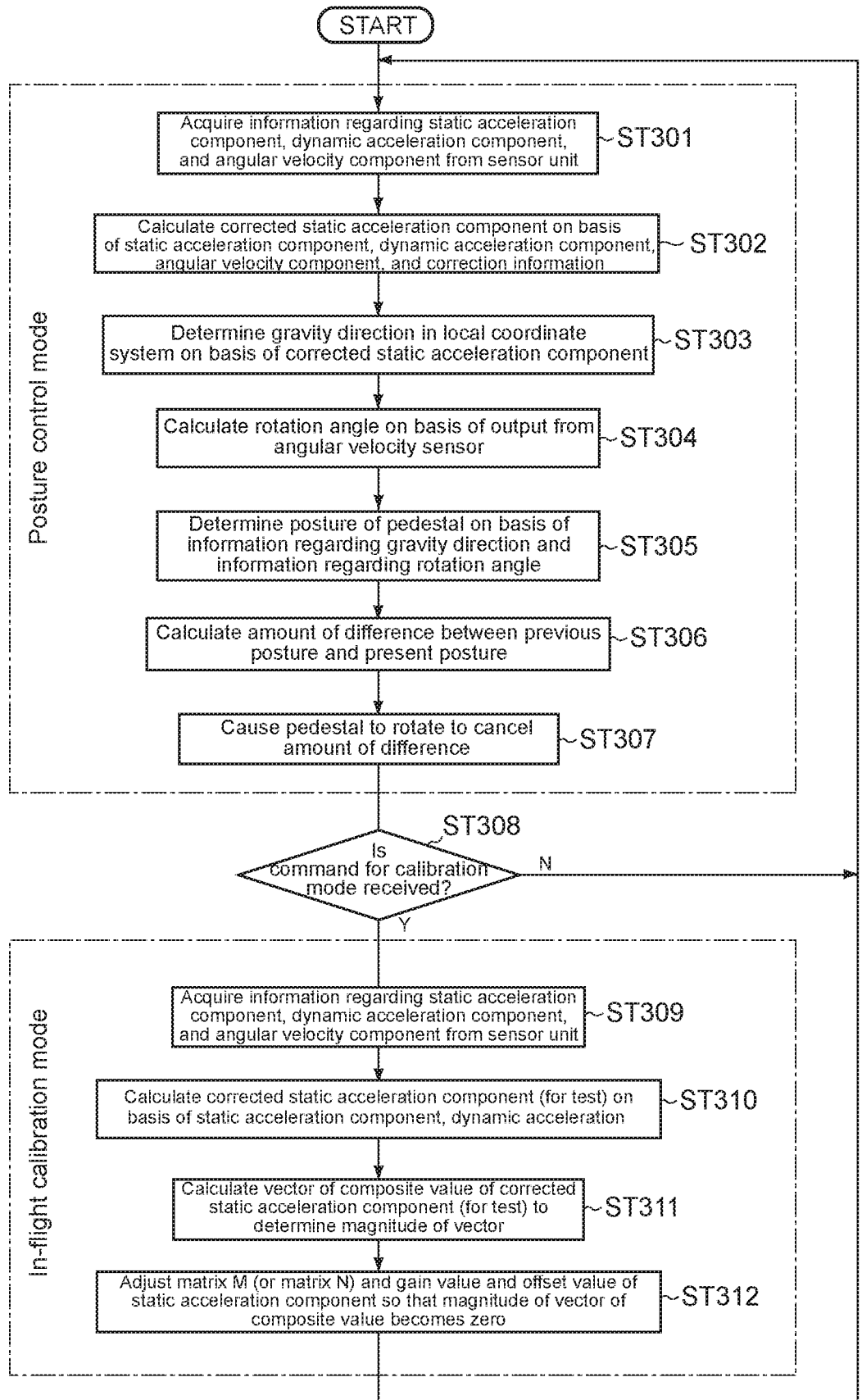
FIG. 18 is a flowchart showing processing of a control unit of a camera gimbal according to a third embodiment.

FIG. 18 is a flowchart showing processing of the control unit 61 of the camera gimbal 50 according to the third embodiment.

When the drone and the camera gimbal 50 are activated by turning on the power or the like and the drone starts flying, the control unit 61 of the camera gimbal 50 executes the posture control mode (see Step 301 to Step 307).

Since the processing (Step 301 to Step 307) in the posture control mode in the third embodiment is similar to that of Step 101 to Step 107 in the first embodiment, description thereof will be omitted.

Note that in the third embodiment, the stationary calibration mode may be executed before the posture control mode, similarly to the second embodiment. In this case, the processing of Step 301 to Step 307 in the third embodiment is the same as the processing of Step 207 to Step 213 in the second embodiment.

When executing the posture control mode, the control unit 61 determines whether or not a command of an in-flight calibration mode is received from the drone (Step 308).

In the case where the command of the in-flight calibration is not received from the drone (NO in Step 308), the processing returns to Step 301 and the control unit 61 executes the posture control mode again. Meanwhile, in the case where the command of the in-flight calibration mode is received from the drone (YES in Step 308), the control unit 61 executes the in-flight calibration mode (see Step 309 to Step 312).

Here, when the in-flight calibration mode is executed, the drone stops the rotation of all propellers of the drone while being in the air, and the drone is brought into a free fall state.

In the in-flight calibration mode, first, the control unit 61 acquires, at a predetermined clock cycle, information regarding the static acceleration component, the dynamic acceleration component, and the angular velocity component output from the sensor unit 40 (Step 309).

Next, the control unit 61 computes, for a test, corrected static acceleration components (Gr-x', Gr-y', and Gr-z') for a test on the basis of the nine elements, i.e., the static acceleration components (Gr-x, Gr-y, and Gr-z), the dynamic acceleration components (Acc-x, Acc-y, and Acc-z), and the angular velocity components ($\omega_x$, $\omega_y$, and $\omega_z$) and the correction information for correcting the static acceleration component (Step 310).

In Step 310, for example, the control unit 61 executes a matrix calculation of $Y^T=MX^T$ to acquire the transposed matrix $Y^T$ of the corrected static acceleration components (for a test). Alternatively, the control unit 61 executes a matrix calculation of $Y^T=NX^T+Z^T$ to acquire the transposed matrix $Y^T$ of the corrected static acceleration components (for a test). Then, the control unit 61 acquires, from the obtained transposed matrix $Y^T$, the corrected static acceleration components (for a test).

Here, the nine elements (Gr-x, Gr-y, Gr-z, Acc-x, Acc-y, Acc-z, $\omega_x$, $\omega_y$, and $\omega_z$) used when acquiring the corrected static acceleration components (for a test) may be a set of nine elements of the current time or a plurality of sets of nine elements of a period from a predetermined time before the current time (after the time when entering a free fall state) to the current time.

When the corrected static acceleration components (for a test) are computed, then, the control unit 61 computes, in the local coordinate system, the vector of the composite value ($\sqrt{((Gr-x')^2+(Gr-y')^2+(Gr-z')^2)}$) of the static acceleration components (for a test) to determine the magnitude of the vector (Step 311).

Next, the control unit 61 adjusts (generates) the matrix M (or the matrix N) and a gain value and an offset value of the static acceleration component so that the magnitude of the vector of the composite value is zero (Step 312). That is, since the acceleration sensor 10 is in a state of weightlessness and the magnitude of the vector of the composite value is zero in the case where the drone is in a free fall state, calibration is performed in accordance with this. In this embodiment, the matrix M (or the matrix N) and the gain value and the offset value of the static acceleration component are each correction information for correcting the static acceleration component.

The drone starts rotation of the propeller after a predetermined time (e.g., approximately several seconds) after stopping the rotation of the propeller, and thus the drone is brought into flight.

After the camera gimbal 50 executes the in-flight calibration mode, the processing returns to Step 301 again, and the posture control mode is executed. Here, in the posture control mode, the correction information adjusted in the in-flight calibration mode is used when computing the corrected static acceleration component (see Step 302).

As described above, in the third embodiment, in the in-flight calibration mode, the matrix M (or the matrix N) and the gain value and the offset value of the static acceleration component are adjusted so that the magnitude of the vector of the composite value of the corrected static acceleration components (for a test) is 0 G. Then, since in the posture control mode, the matrix M (or the matrix N) and the gain value and the offset value of the static acceleration component adjusted in the in-flight calibration mode (i.e., correction information) are used for computing the corrected static acceleration component, it is possible to determine the gravity direction with higher precision.

In particular, in the third embodiment, it is possible to perform calibration by the camera gimbal 50 while the drone is flying (in the air).

In the description of the third embodiment, the case where the drone is in the free fall state when stopping the driving of the propeller and the acceleration sensor 10 is in the weightless state has been described. Meanwhile, in the case where the shape of the drone body is an airplane type (fixed wing type) or the like, the drone is not in the free fall state because the lift of the wing is generated even when stopping the driving of the propeller, and the acceleration sensor 10 detects a certain acceleration in some cases.

Therefore, in such a case, the control unit 61 adjusts the matrix M (or the matrix N) and the gain value and the offset value of the static acceleration component so that the magnitude of the vector of the composite value is a predetermined value (not 0) in Step 312. As the above-mentioned predetermined value to be the source of calibration, an appropriate value measured by repeating the test of stopping the driving of the propeller and causing the airplane type drone to fly is used.

Note that in the case where the drone body is an airplane type, the flying state can be stably maintained to a certain extent even when the driving of the propeller is stopped in the air for calibration.

Various Modified Examples

In the above description, the case where the sensor unit 40 is disposed on the side of the camera gimbal 50 has been described. Meanwhile, the sensor unit 40 may be disposed on the side of the camera. In this case, the sensor unit 40 detects the accelerations in the three axes (X', Y', and Z' axes) in the camera and the angular velocities around the three axes (X', Y', and Z' axes)) in the camera, and outputs them to the camera gimbal 50.

In the above description, the camera gimbal 50 has been described as an example of the holding apparatus. Meanwhile, the holding apparatus is not limited to the camera gimbal 50. For example, the holding apparatus may be a holding apparatus that holds an inertial navigation apparatus (an object to be held), or a holding apparatus that holds a rocket engine.

The processing of the control unit 61 in the camera gimbal 50 (or the processing of the controller 20 of the sensor unit 40) described above may be executed by the camera (i.e., an object to be held) (in this case, the camera (object to be held) is the posture control apparatus). Alternatively, this processing may be executed by a server apparatus on the network (in this case, the server apparatus is the posture control apparatus).

The present technology may take the following configurations.

(1) A posture control apparatus, including
a control unit that determines, on a basis of a static acceleration component, a gravity direction in a holding apparatus holding an object to be held, the static acceleration component being computed on a basis of a first acceleration detection signal and a second acceleration detection signal, the first acceleration detection signal being acquired by detecting a dynamic acceleration component acting on the holding apparatus, the second acceleration detection signal being acquired by detecting the dynamic acceleration component and the static acceleration component acting on the holding apparatus, and controls, by controlling posture of the holding apparatus on a basis of the gravity direction, posture of the object to be held.

(2) The posture control apparatus according to (1) above, in which
the control unit corrects the static acceleration component on a basis of correction information for correcting the static acceleration component, and determines the gravity direction on a basis of the corrected static acceleration component.

(3) The posture control apparatus according to (2) above, in which the control unit corrects the static acceleration component on a basis of the correction information for correcting the static acceleration component by the dynamic acceleration component.

(4) The posture control apparatus according to (2) or (3) above, in which the control unit corrects the static acceleration component on a basis of the correction information for correcting the static acceleration component by the angular velocity component acting on the holding apparatus.

(5) The posture control apparatus according to any one of (2) to (4) above, in which the control unit generates the correction information while the holding apparatus is disposed at a certain place.

(6) The posture control apparatus according to any one of (2) to (5) above, in which the holding apparatus is attached to a flight vehicle, and the control unit generates the correction information while the flight vehicle is in the air.

(7) The posture control apparatus according to any one of (1) to (6) above, further including an acceleration calculation unit that computes the static acceleration component on a basis of the first acceleration detection signal and the second acceleration detection signal, the first acceleration detection signal having an alternating current waveform corresponding to the dynamic acceleration component, the second acceleration detection signal having an output waveform, an alternating current waveform corresponding to the dynamic acceleration component being superimposed on a direct current component corresponding to the static acceleration component in the output waveform.

(8) The posture control apparatus according to (7) above, in which the acceleration calculation unit includes a calculation circuit that computes the static acceleration component on a basis of a difference signal between the first acceleration detection signal and the second acceleration detection signal.

(9) The posture control apparatus according to (8) above, in which the acceleration calculation unit further includes a gain adjustment circuit that adjusts gain of each signal so that the first acceleration detection signal and the second acceleration detection signal are at the same level.

(10) The posture control apparatus according to (9) above, in which the acceleration calculation unit further includes a correction circuit that computes a correction coefficient on a basis of the difference signal and corrects one of the first acceleration detection signal and the second acceleration detection signal using the correction coefficient.

(11) The posture control apparatus according to any one of (1) to (10) above, further including a detection unit including a movable portion, a piezoelectric first acceleration detection unit, and a non-piezoelectric second acceleration detection unit, the movable portion being movable upon receiving an acceleration acting on the holding apparatus, the piezoelectric first acceleration detection unit being provided on the movable portion to output the first acceleration detection signal, the non-piezoelectric second acceleration detection unit being provided on the movable portion to output the second acceleration detection signal.

(12) The posture control apparatus according to (11) above, in which the second acceleration detection unit includes a piezoresistive acceleration detection device.

(13) The posture control apparatus according to (11) above, in which the second acceleration detection unit includes a capacitive acceleration detection device.

(14) A posture control apparatus, including a control unit that determines, on a basis of a static acceleration component, a gravity direction in an object to be held by a holding apparatus, the static acceleration component being computed on a basis of a first acceleration detection signal and a second acceleration detection signal, the first acceleration detection signal being acquired by detecting a dynamic acceleration component acting on the object to be held, the second acceleration detection signal being acquired by detecting the dynamic acceleration component and the static acceleration component acting on the object to be held, and controls, by controlling posture of the holding apparatus on a basis of the gravity direction, posture of the object to be held.

(15) A holding apparatus, including:

a detection unit that outputs a first acceleration detection signal and a second acceleration detection signal, the first acceleration detection signal being acquired by detecting a dynamic acceleration component acting on a holding apparatus holding an object to be held, the second acceleration detection signal being acquired by detecting the dynamic acceleration component and a static acceleration component acting on the holding apparatus; and a control unit that determines, on a basis of the static acceleration component computed on a basis of the first acceleration detection signal and the second acceleration detection signal, a gravity direction in the holding apparatus, and controls, by controlling posture of the holding apparatus on a basis of the gravity direction, posture of the object to be held.

(16) A posture control method, including:

determining, on a basis of a static acceleration component, a gravity direction in a holding apparatus holding an object to be held, the static acceleration component being computed on a basis of a first acceleration detection signal and a second acceleration detection signal, the first acceleration detection signal being acquired by detecting a dynamic acceleration component acting on the holding apparatus, the second acceleration detection signal being acquired by detecting the dynamic acceleration component and the static acceleration component acting on the holding apparatus; and controlling, by controlling posture of the holding apparatus on a basis of the gravity direction, posture of the object to be held.

(17) A program that causes a computer to execute the steps of:

determining, on a basis of a static acceleration component, a gravity direction in a holding apparatus holding an object to be held, the static acceleration component being computed on a basis of a first acceleration detection signal and a second acceleration detection signal, the first acceleration detection signal being acquired by detecting a dynamic acceleration component acting on the holding apparatus, the second acceleration detection signal being acquired by detecting the dynamic acceleration component and the static acceleration component acting on the holding apparatus; and controlling, by controlling posture of the holding apparatus on a basis of the gravity direction, posture of the object to be held.

REFERENCE SIGNS LIST 10 acceleration sensor
11 first acceleration detection unit
12 second acceleration detection unit
20 controller
30 angular velocity sensor
31 angular velocity detection unit
40 sensor unit
50 camera gimbal
61 control unit

The invention claimed is:

1. A posture control apparatus, comprising
a control unit that determines, on a basis of a static acceleration component, a gravity direction in a holding apparatus holding an object to be held, the static acceleration component being computed on a basis of a first acceleration detection signal and a second acceleration detection signal, the first acceleration detection signal being acquired by detecting a dynamic acceleration component acting on the holding apparatus, the second acceleration detection signal being acquired by detecting the dynamic acceleration component and the static acceleration component acting on the holding apparatus, and controls, by controlling posture of the holding apparatus on a basis of the gravity direction, posture of the object to be held.

2. The posture control apparatus according to claim 1, wherein
the control unit corrects the static acceleration component on a basis of correction information for correcting the static acceleration component, and determines the gravity direction on a basis of the corrected static acceleration component.

3. The posture control apparatus according to claim 2, wherein
the control unit corrects the static acceleration component on a basis of the correction information for correcting the static acceleration component by the dynamic acceleration component.

4. The posture control apparatus according to claim 2, wherein
the control unit corrects the static acceleration component on a basis of the correction information for correcting the static acceleration component by the angular velocity component acting on the holding apparatus.

5. The posture control apparatus according to claim 2, wherein
the control unit generates the correction information while the holding apparatus is disposed at a certain place.

6. The posture control apparatus according to claim 2, wherein
the holding apparatus is attached to a flight vehicle, and the control unit generates the correction information while the flight vehicle is in the air.

7. The posture control apparatus according to claim 1, further comprising
an acceleration calculation unit that computes the static acceleration component on a basis of the first acceleration detection signal and the second acceleration detection signal, the first acceleration detection signal having an alternating current waveform corresponding to the dynamic acceleration component, the second acceleration detection signal having an output waveform, an alternating current waveform corresponding to the dynamic acceleration component being superimposed on a direct current component corresponding to the static acceleration component in the output waveform.

8. The posture control apparatus according to claim 7, wherein
the acceleration calculation unit includes a calculation circuit that computes the static acceleration component on a basis of a difference signal between the first acceleration detection signal and the second acceleration detection signal.

9. The posture control apparatus according to claim 8, wherein
the acceleration calculation unit further includes a gain adjustment circuit that adjusts gain of each signal so that the first acceleration detection signal and the second acceleration detection signal are at the same level.

10. The posture control apparatus according to claim 9, wherein
the acceleration calculation unit further includes a correction circuit that computes a correction coefficient on a basis of the difference signal and corrects one of the first acceleration detection signal and the second acceleration detection signal using the correction coefficient.

11. The posture control apparatus according to claim 1, further comprising
a detection unit including a movable portion, a piezoelectric first acceleration detection unit, and a non-piezoelectric second acceleration detection unit, the movable portion being movable upon receiving an acceleration acting on the holding apparatus, the piezoelectric first acceleration detection unit being provided on the movable portion to output the first acceleration detection signal, the non-piezoelectric second acceleration detection unit being provided on the movable portion to output the second acceleration detection signal.

12. The posture control apparatus according to claim 1, wherein
the second acceleration detection unit includes a piezoresistive acceleration detection device.

13. The posture control apparatus according to claim 11, wherein
the second acceleration detection unit includes a capacitive acceleration detection device.

14. A posture control apparatus, comprising
a control unit that determines, on a basis of a static acceleration component, a gravity direction in an object to be held by a holding apparatus, the static acceleration component being computed on a basis of a first acceleration detection signal and a second acceleration detection signal, the first acceleration detection signal being acquired by detecting a dynamic acceleration component acting on the object to be held, the second acceleration detection signal being acquired by detecting the dynamic acceleration component and the static acceleration component acting on the object to be held, and controls, by controlling posture of the holding apparatus on a basis of the gravity direction, posture of the object to be held.

15. A holding apparatus, comprising:
a detection unit that outputs a first acceleration detection signal and a second acceleration detection signal, the first acceleration detection signal being acquired by detecting a dynamic acceleration component acting on a holding apparatus holding an object to be held, the second acceleration detection signal being acquired by detecting the dynamic acceleration component and a static acceleration component acting on the holding apparatus; and a control unit that determines, on a basis of the static acceleration component computed on a basis of the first acceleration detection signal and the second acceleration detection signal, a gravity direction in the holding apparatus, and controls, by controlling posture of the holding apparatus on a basis of the gravity direction, posture of the object to be held.

16. A posture control method, comprising:

determining, on a basis of a static acceleration component, a gravity direction in a holding apparatus holding an object to be held, the static acceleration component being computed on a basis of a first acceleration detection signal and a second acceleration detection signal, the first acceleration detection signal being acquired by detecting a dynamic acceleration component acting on the holding apparatus, the second acceleration detection signal being acquired by detecting the dynamic acceleration component and the static acceleration component acting on the holding apparatus; and controlling, by controlling posture of the holding apparatus on a basis of the gravity direction, posture of the object to be held.

17. A program that causes a computer to execute the steps of:

determining, on a basis of a static acceleration component, a gravity direction in a holding apparatus holding an object to be held, the static acceleration component being computed on a basis of a first acceleration detection signal and a second acceleration detection signal, the first acceleration detection signal being acquired by detecting a dynamic acceleration component acting on the holding apparatus, the second acceleration detection signal being acquired by detecting the dynamic acceleration component and the static acceleration component acting on the holding apparatus; and controlling, by controlling posture of the holding apparatus on a basis of the gravity direction, posture of the object to be held.

* * * * *